United States Patent
P. V. et al.

(10) Patent No.: US 10,528,320 B2
(45) Date of Patent: Jan. 7, 2020

(54) SYSTEM AND METHOD FOR SPEECH-BASED NAVIGATION AND INTERACTION WITH A DEVICE'S VISIBLE SCREEN ELEMENTS USING A CORRESPONDING VIEW HIERARCHY

(71) Applicant: Google Technology Holdings LLC, Mountain View, CA (US)

(72) Inventors: Sanjeev Kumar P. V., Kanataka (IN); Amit K. Agrawal, Karnataka (IN); Satyabrata Rout, Karnataka (IN); Vishal S. Patil, Karnataka (IN)

(73) Assignee: Google Technology Holdings LLC, Mountain View, CA (US)

( * ) Notice: Subject to any disclaimer, the term of this patent is extended or adjusted under 35 U.S.C. 154(b) by 331 days.

(21) Appl. No.: 15/424,324

(22) Filed: Feb. 3, 2017

(65) Prior Publication Data

US 2017/0206060 A1  Jul. 20, 2017

Related U.S. Application Data

(63) Continuation of application No. 14/086,454, filed on Nov. 21, 2013, now Pat. No. 9,600,227.

(51) Int. Cl.
*G10L 15/22* (2006.01)
*G06F 3/16* (2006.01)
(Continued)

(52) U.S. Cl.
CPC ............ *G06F 3/167* (2013.01); *G06F 3/0482* (2013.01); *G06F 3/04817* (2013.01);
(Continued)

(58) Field of Classification Search
CPC ................................ G10L 15/22; G10L 15/26
See application file for complete search history.

(56) References Cited

U.S. PATENT DOCUMENTS 7,657,828 B2   2/2010   Lucas
8,396,193 B2   3/2013   McGary
(Continued)

FOREIGN PATENT DOCUMENTS

EP        1031964       9/2003
WO    2003071385       8/2003

OTHER PUBLICATIONS

Sven Reichel et al., "Speech Dialog Generation from Graphical UIs of Nomadic Devices and the Integration into an Automotive HMI", Adjunct Proceedings of the 4th Int'l Conf. on Automotive User Interfaces and Interactive Vehicular Applications, http://www.uni-ulm.de/fileadmin/website_uni_ulm/iui.inst.100/instituUPapers/Prof_Weber/autoUI_reichel2012.pdf, Oct. 17-19, 2012, pp. 34-35.

(Continued)

*Primary Examiner* — Michael N Opsasnick
(74) *Attorney, Agent, or Firm* — Fish & Richardson P.C.

(57) ABSTRACT

Methods, systems, and apparatus, including computer programs encoded on a computer storage medium, for enabling screen-specific user interfacing with elements of viewable screens presented by an electronic device are disclosed. In one aspect, a method includes the actions of identifying a character sequence representing a first input that is received while displaying a viewable screen having at least one selectable viewable element. The actions further include accessing an electronic file that provides a text representation of one or more of the at least one selectable viewable element. The actions further include comparing the character sequence to the text representation. The actions further include selecting, within the viewable screen, a selectable viewable element whose text representation matches the character sequence. The actions further include triggering any action linked to the selecting the selectable viewable element.

20 Claims, 34 Drawing Sheets

(51) Int. Cl.
*G10L 15/26* (2006.01)
*G06F 3/0481* (2013.01)
*G06F 3/0482* (2013.01)
*G06F 9/451* (2018.01)

(52) U.S. Cl.
CPC .............. *G10L 15/26* (2013.01); *G06F 9/451* (2018.02); *G10L 2015/223* (2013.01)

(56) References Cited

U.S. PATENT DOCUMENTS

| | | | | |
|---|---|---|---|---|
| 8,990,068 | B2* | 3/2015 | Orsini | G06F 17/2854 |
| | | | | 704/2 |
| 8,990,235 | B2* | 3/2015 | King | G06F 17/2211 |
| | | | | 707/759 |
| 8,996,352 | B2* | 3/2015 | Orsini | G06F 17/2854 |
| | | | | 434/157 |
| 8,996,355 | B2* | 3/2015 | Orsini | G06F 17/289 |
| | | | | 704/2 |
| 9,123,339 | B1* | 9/2015 | Shaw | G10L 15/22 |
| 9,507,860 | B1* | 11/2016 | Oztaskent | G06F 16/63 |
| 9,600,227 | B2* | 3/2017 | P.V. | G06F 3/04817 |
| 10,176,254 | B2* | 1/2019 | Oztaskent | G06F 16/63 |
| 2003/0125955 | A1 | 7/2003 | Arnold | |
| 2004/0230637 | A1 | 11/2004 | Lecoueche | |
| 2005/0203747 | A1 | 9/2005 | Lecoeuche | |
| 2007/0050411 | A1 | 3/2007 | Hull | |
| 2008/0015864 | A1 | 1/2008 | Ross | |
| 2008/0221879 | A1 | 9/2008 | Cerra | |
| 2008/0243507 | A1 | 10/2008 | Gopinath | |
| 2009/0013255 | A1 | 1/2009 | Yuschik | |
| 2009/0313016 | A1 | 12/2009 | Cevik | |
| 2011/0066634 | A1* | 3/2011 | Phillips | G10L 15/22 |
| | | | | 707/769 |
| 2011/0131036 | A1 | 6/2011 | DiCristo | |
| 2011/0167110 | A1 | 7/2011 | Hoffberg | |
| 2012/0095765 | A1 | 4/2012 | Bodin et al. | |
| 2012/0245944 | A1* | 9/2012 | Gruber | G10L 15/22 |
| | | | | 704/270.1 |
| 2012/0260176 | A1* | 10/2012 | Sehrer | G06F 3/167 |
| | | | | 715/727 |
| 2012/0260177 | A1* | 10/2012 | Sehrer | G06F 3/167 |
| | | | | 715/727 |
| 2015/0142435 | A1* | 5/2015 | Kumar P.V. | G06F 3/04817 |
| | | | | 704/235 |

OTHER PUBLICATIONS

Nuance Communications, Inc., "Dragon Naturally Speaking version 11 End-User Workbook", http://www.nuance.com/index.htm, Mar. 2011, revision 1-9, 108 pages.

Shane Conder and Lauren Darcey, "Android Tools: Using the Hierarchy Viewer", http://mobile.tutsplus.com/tutorials/android/android-tools-using-the-hierarchy-viewer/, Jul. 25, 2011, 7 pages.

Institute of Media Informatics, "Automatic Speech Dialog Generation from User Interfaces of Mobile Applications" video, https://www.youtube.com/watch?v=gdHDhhNfvvk, May 18, 2012.

* cited by examiner

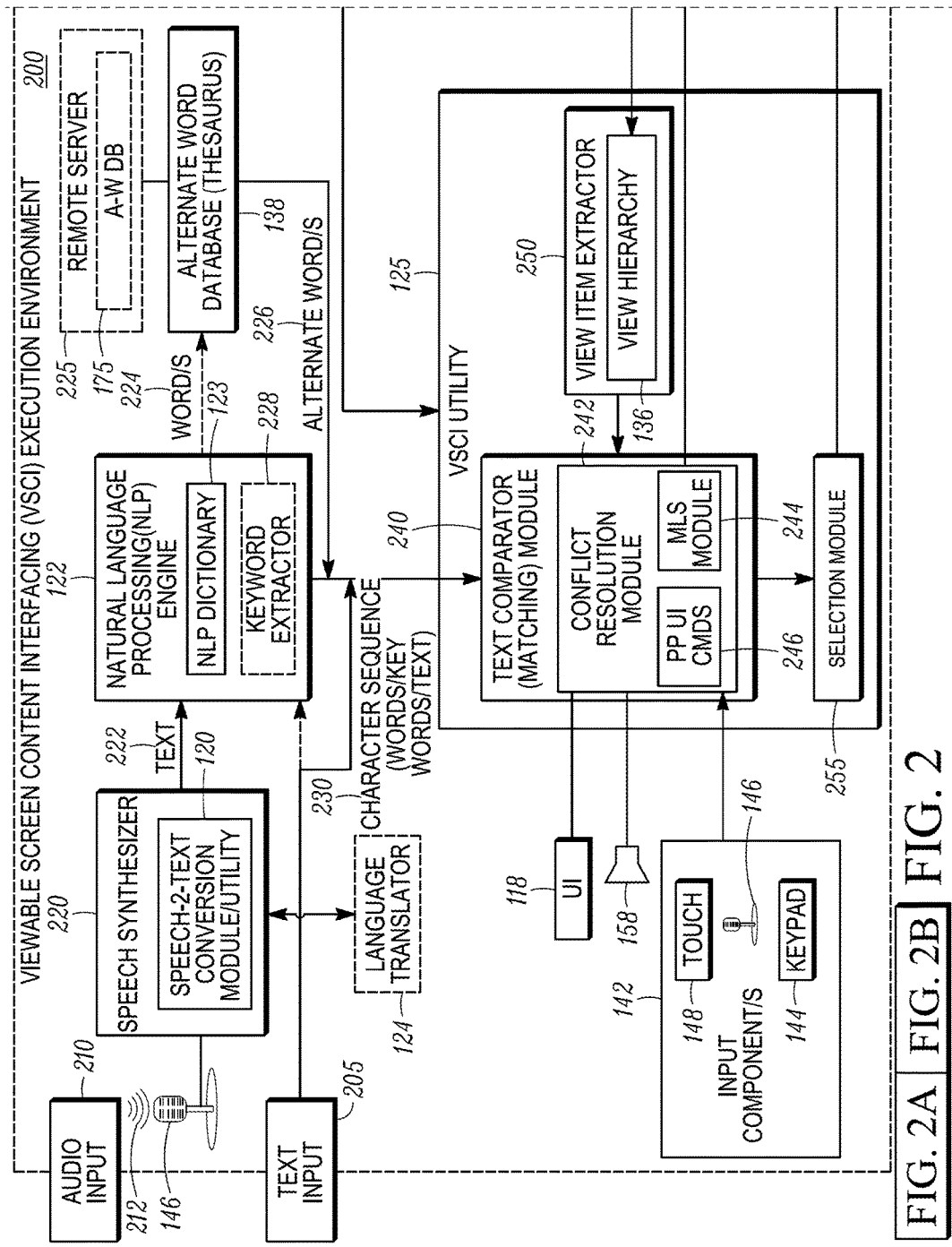

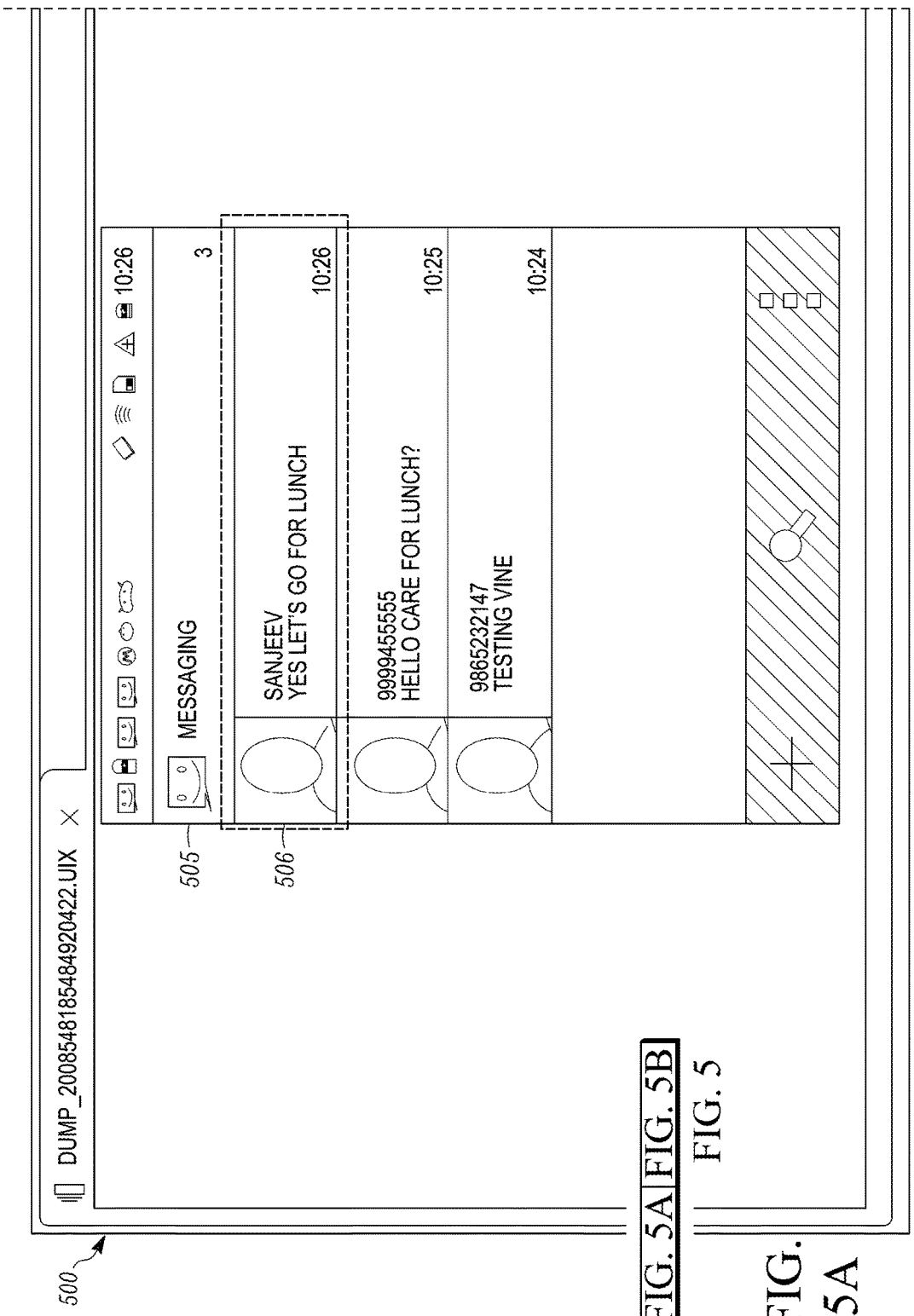

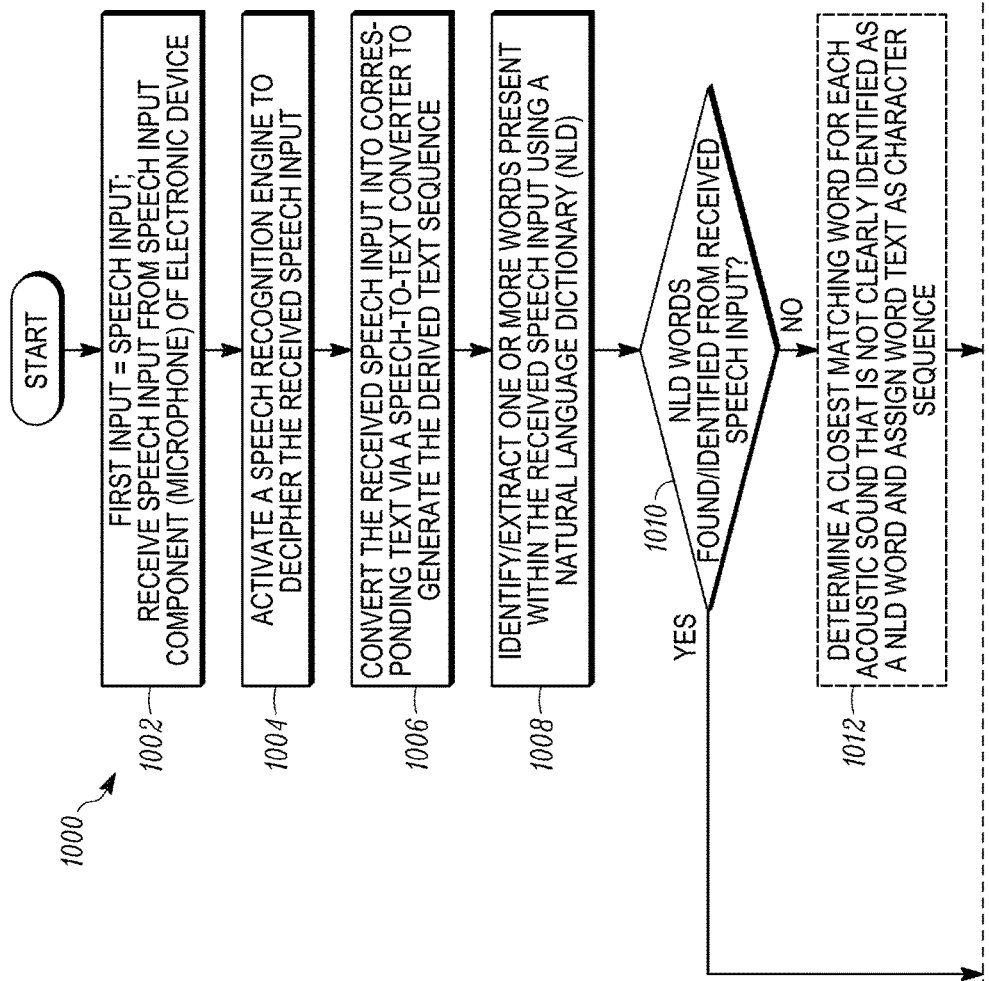

SYSTEM AND METHOD FOR SPEECH-BASED NAVIGATION AND INTERACTION WITH A DEVICE'S VISIBLE SCREEN ELEMENTS USING A CORRESPONDING VIEW HIERARCHY

CROSS-REFERENCE TO RELATED APPLICATION

This application is a continuation of U.S. application Ser. No. 14/086,454, now U.S. Pat. No. 9,600,227, filed Nov. 21, 2013, the contents of which are herein incorporated by reference.

BACKGROUND

1. Technical Field

The present disclosure generally relates to interfacing with elements of a viewable screen presented on an electronic device. In particular, the disclosure relates to speech-directed interfacing with elements on a viewable screen enabled by reference to a view hierarchy associated with the viewable screen.

2. Description of the Related Art

A large number of electronic devices that support speech-based user interfaces with elements on a viewable screen rely on pre-defined speech commands to trigger functions associated with the displayed elements of the screen. For example, on mobile devices, these existing speech recognition based mechanisms execute a pre-defined set of actions, such as "Turn on WiFi", "Call Alice", "New Message", and others. These implementations are limited to the pre-defined set of actions, and updates to screens require commensurate updates to the list of speech commands available for that screen.

BRIEF DESCRIPTION OF THE DRAWINGS

The disclosure will best be understood by reference to the following detailed description of illustrative embodiments when read in conjunction with the accompanying drawings, wherein:

FIGS. 2A and 2B show a block flow diagram illustrating an example execution environment that enables selection of specific elements on a viewable screen of an electronic device using text and/or speech input and a view hierarchy of the elements on the viewable screen, in accordance with one or more embodiments;

FIGS. 5A and 5B illustrate a second example of an extended display with a viewable screen and corresponding view hierarchy that can be utilized to support use of text and/or speech input to enable selection of specific elements available within the viewable screen, according to multiple embodiments;

FIGS. 10A and 10B illustrate a flow chart of a method for converting speech input into derived text sequences or words for use in determining a matching text representation of elements of the viewable screen, according to at least one embodiment;

Figure 1A:
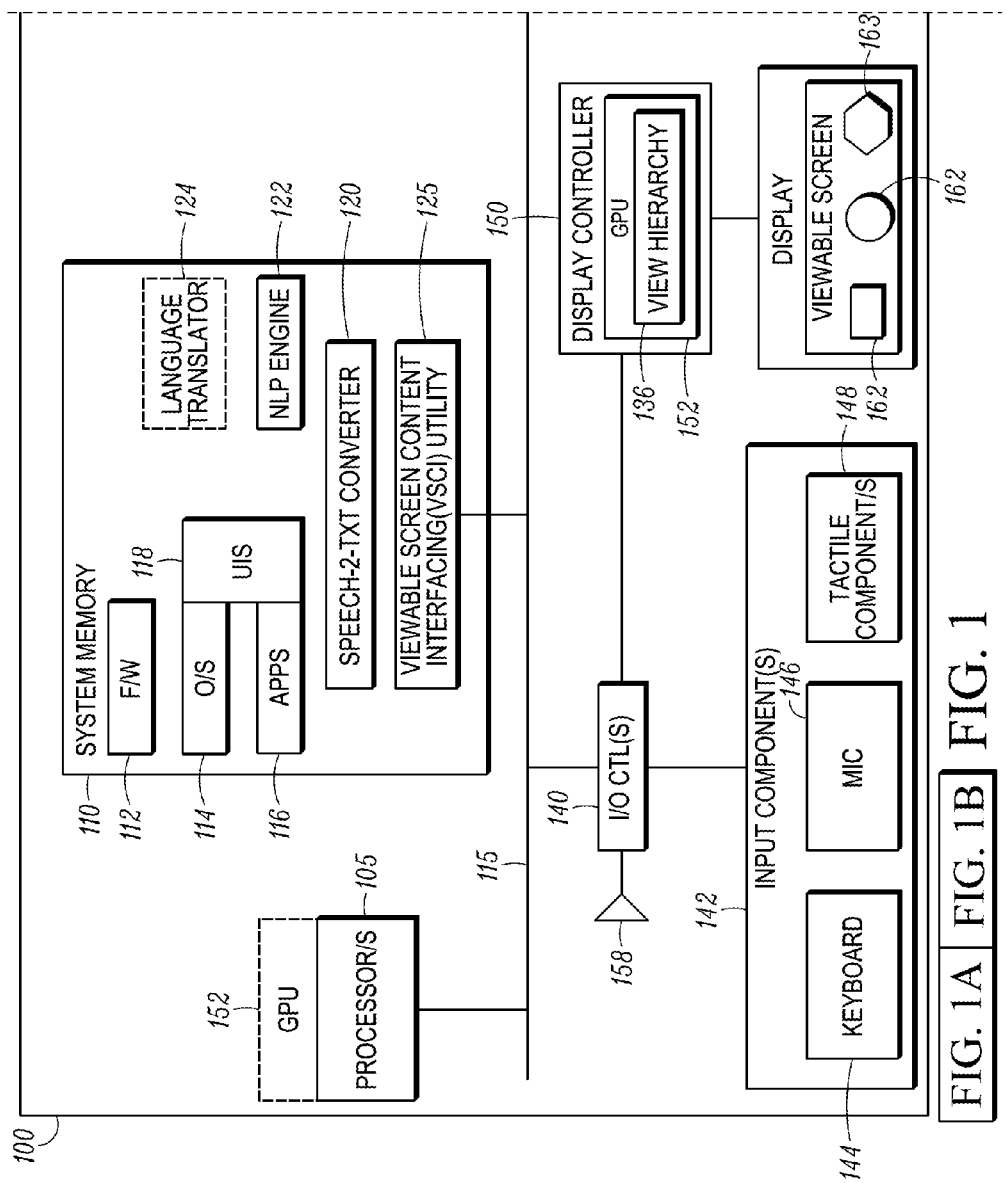
FIGS. 1A and 1B illustrate a block diagram of an example electronic device having a display component for presenting a viewable screen having at least one element that can be selected based on received user input, according to one or more embodiments.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein. Also, within the descriptions of the different figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

DETAILED DESCRIPTION OF ILLUSTRATIVE EMBODIMENTS

The present disclosure provides an electronic device and a method for enabling screen-specific user interfacing with elements of viewable screens presented by the electronic device. The method generally includes: identifying a character sequence representing a first speech input that is received while displaying a viewable screen having at least one selectable viewable element; accessing an electronic file that provides a text representation of one or more of the at least one selectable viewable element; comparing the character sequence to the text representation of each of the selectable elements associated with the viewable screen; and in response to detecting a match of the character sequence with at least one text representation, a processor of the electronic device (i) selecting, within the viewable screen, a corresponding selectable element whose text representation matches the character sequence and (ii) triggering any action linked to the selecting of the corresponding selectable element.

According to one aspect of the disclosure, the electronic file is a view hierarchy of the viewable screen and the process of accessing the electronic file includes extracting the text representation of each selectable element, sub-element, and properties associated with each element, from the hierarchy view. Also, the process of comparing the character sequence to the text representation of the at least one element includes comparing the character sequence to the text representation of the element, sub-element, and properties of the element. Additionally, the process of detecting the match includes determining that the character sequence has an approximate match to the text representation of at least one of the selectable element, sub-element, and properties of the element.

Figure 1B:
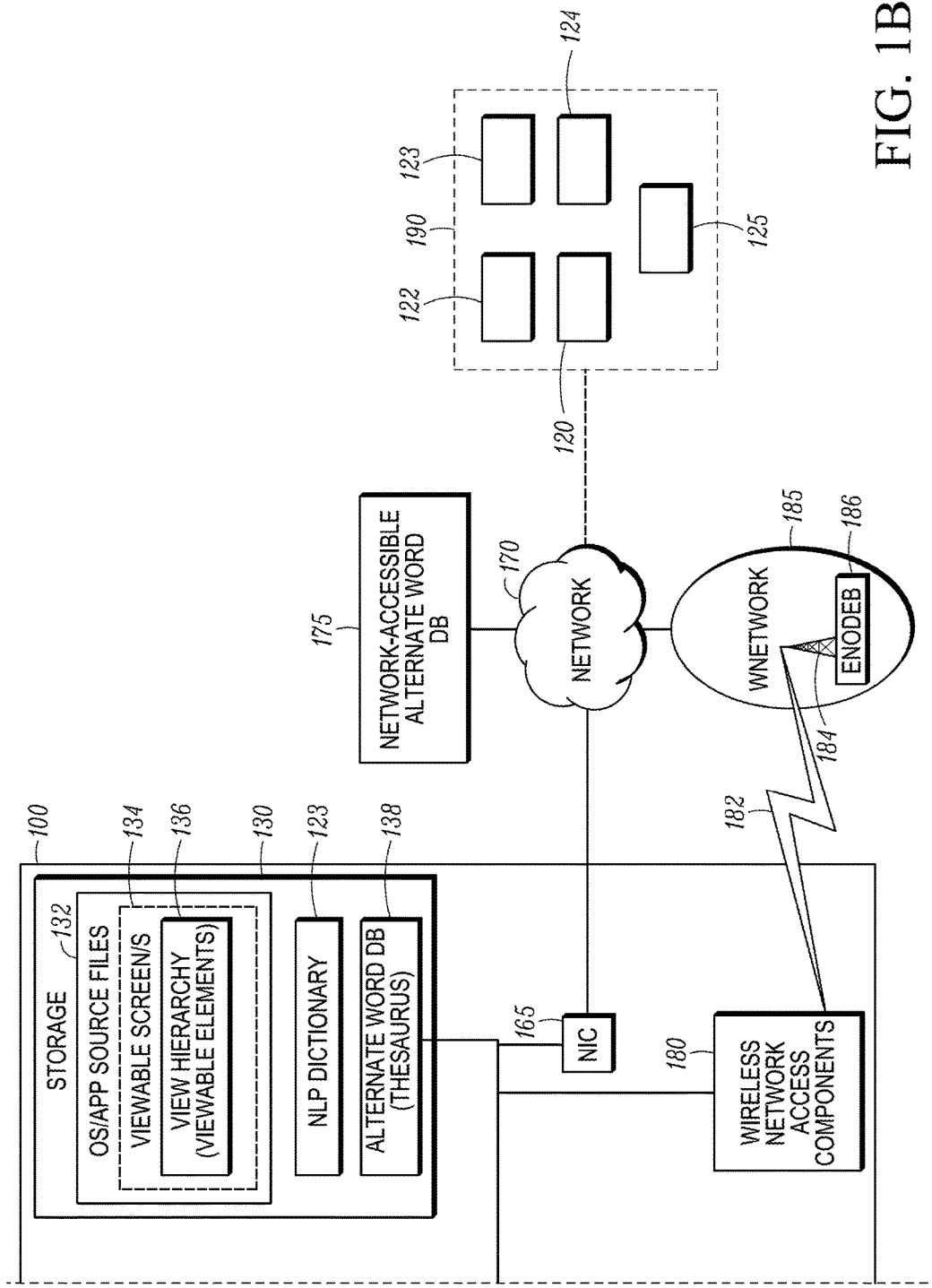

With reference now to the figures, and beginning with FIGS. 1A and 1B, there is depicted a block diagram representation of an example electronic device 100, which is configured as a data processing system, and within which one or more of the described features of the various embodiments of the disclosure can be implemented. As will become clear by the description which follows, the functionality provided by the disclosure can be applicable to a large number of different electronic devices, such as, but not limited to a desktop computer, a laptop computer, a tablet computer, a mobile phone, a smart phone, a personal digital assistant (PDA), gaming systems, media players, and others. The devices within which the various functional aspects of the disclosure can be implemented are devices that (a) include or are capable of being connected to a display for outputting graphical or visual content on a screen, (b) include an operating system construct that provides some sort of electronic text file representation of the visual content presented or displayed on the screen, (c) include one or more components for generating the screen with the visual content, and (d) include one or more input components for receiving user inputs. In the illustrated embodiments, the input components include a microphone for receiving speech input; however, aspects of the disclosure can also be applicable to direct text input. Other functional components of electronic device 100 are illustrated in FIGS. 1A and 1B, which is now described.

Electronic device 100 includes one or more processor/s 105 coupled via system interconnect 115. System interconnect 115 can be interchangeably referred to as a system bus, in one or more embodiments. Also coupled to system interconnect 115 is system memory 110 and persistent storage 130, each of which can have an associated controller (not shown). Following device power-on and during device operation, software and/or firmware modules maintained within persistent storage 130 can be loaded into system memory 110 for execution by processor/s 105. As shown, system memory 110 can include a number of software and/or firmware modules including firmware (F/W) 112, operating system (O/S) 114, and application(s) 116. During execution by processor/s 105, 0/S 114 and application(s) 116 generate user interfaces 118, which can be displayed as/within a viewable screen 160 on a connected display 156. At least some viewable screens (e.g., viewable screen 160) include user-selectable viewable elements 162 such as virtual buttons, virtual keypads, icons, images, and text. As shown, viewable screen 160 can also include additional viewable elements 163, which are not user-selectable. The disclosure is described from the perspective of selectable viewable elements 162 within viewable screens. In addition to the aforementioned firmware and software, and according to one or more embodiments, system memory 110 includes a number of additional modules that collectively enable the performance of various aspects of the disclosure. The modules include speech-to-text converter 120, natural language processing (NLP) engine 122, optional language translator 124, and viewable screen content interfacing (VSCI) utility 125. The use of dash lines for the box around language translator 124 represents that the inclusion of language translator 124 is optional, in some embodiments.

While shown as separate modules within system memory 110, one or more of the above modules can be combined into a single software package or application. For example, VSCI utility 125 can encompass all functionality of each of the various different modules. The various software and/or firmware modules have varying functionality that are provided when their corresponding program code is executed by processor/s 105 or other processing devices within electronic device 100.

Illustrated within storage 130 are additional modules, including source files 132 for both the O/S 114 and application(s) 116. These source files 132 include code for generating viewable screen/s 134 and a view hierarchy 136 for each of the viewable screens. View hierarchy 136 is representative of an electronic file that includes a text representation of selectable elements within a viewable screen. Storage 130 also includes NLP dictionary 123 and, in at least one embodiment, an alternate word database 138. Alternate word database 138 can be inclusive of a thesaurus. As will become clear in the descriptions of the functional aspects of the disclosure, an alternate word selected from alternate word database 138 can be a synonym of a received text or word input (e.g., speech converted to text). However, the alternate word can also be an antonym of the received input or an expansion or definition of a coded input or shortened input, such as an acronym, for example.

Electronic device 100 further includes one or more input/output (I/O) controllers 140 which support connection by, and processing of signals from, one or more connected input component(s) 142, such as a keyboard 144, microphone 146, or tactile component/s 148 (e.g., mouse or touch screen). I/O controllers 140 also support connection to and forwarding of output signals to one or more connected output components, such as a monitor or display 156 or audio speaker(s) 158. Access to display 156 is controlled by display controller 150, which can include a graphical processing unit (GPU) 152. In one or more embodiments, display controller 150 can be a graphics card with GPU 152 located thereon. However, as further illustrated, in at least one embodiment, GPU 152 can optionally be integrated onto a processor chip or block that includes processor/s 105. Functionality of GPU 152 germane to the disclosure will be described further within the following description. As an example, display 156 can be a liquid crystal display (LCD). However, use of any other type of display 156 is supported by the disclosure. It is appreciated that the display 156 described within the various embodiments can be a display configured for use as a display peripheral requiring a cable or other form of connection to a separate electronic device that generates or provides the image/screen data for presentation on the display 156. Alternatively, the display component can be an integral part of the actual electronic device, such as an LCD screen utilized with tablet computers, smartphones, and single integrated personal computing systems.

Electronic device 100 further has a network interface component (NIC) 165. NIC 165 enables electronic device 100 to communicate and/or interface with other devices, services, and components that are located external to electronic device 100. These devices, services, and components can interface with electronic device 100 via an external network, such as example network 170, using one or more communication protocols. Network 170 can be a local area network, wide area network, personal area network, and the like. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

Among the devices that are accessible via network 170 is network-accessible alternate word database 175, which can provide similar functionality as alternate word DB 138. Also, in one or more embodiments, several of the modules introduced within system memory 110 and storage 130 can optionally be available via a connection to one or more external services, hosted on one or more network server/s 190, over network 170. Among these modules can be speech-to-text converter 120, NLP engine 122 and associated NLP dictionary 123, and optional language translator 124. Additionally, in one embodiment, VSCI utility 125 can be downloaded to electronic device 100 as an application or utility from network server 190.

Additionally or alternatively to the physical connection to network 170 via NIC 165, electronic device 100 can also include wireless network access components 180 which enable electronic device 100 to communicate with a wireless network 185 via a wireless (i.e., over-the-air) medium 182. Wireless network 185 can include one or more base stations, such as evolved node B (eNodeB) 186 with associated antenna 184. Alternate wireless networks can include one or more access points such as a WLAN access point, a Bluetooth transceiver, an infrared transceiver, a NFC transceiver, and the like. As further shown, wireless network 185 can be connected to network 170 for access to the one or more other devices accessible via network 170. It is appreciated that for implementations in which electronic device 100 is a wireless communication device, such as a mobile phone, many of the physical components of electronic device 100 can be different or differently configured, with components such as NIC 165 not present or supported.

Figure 2B:
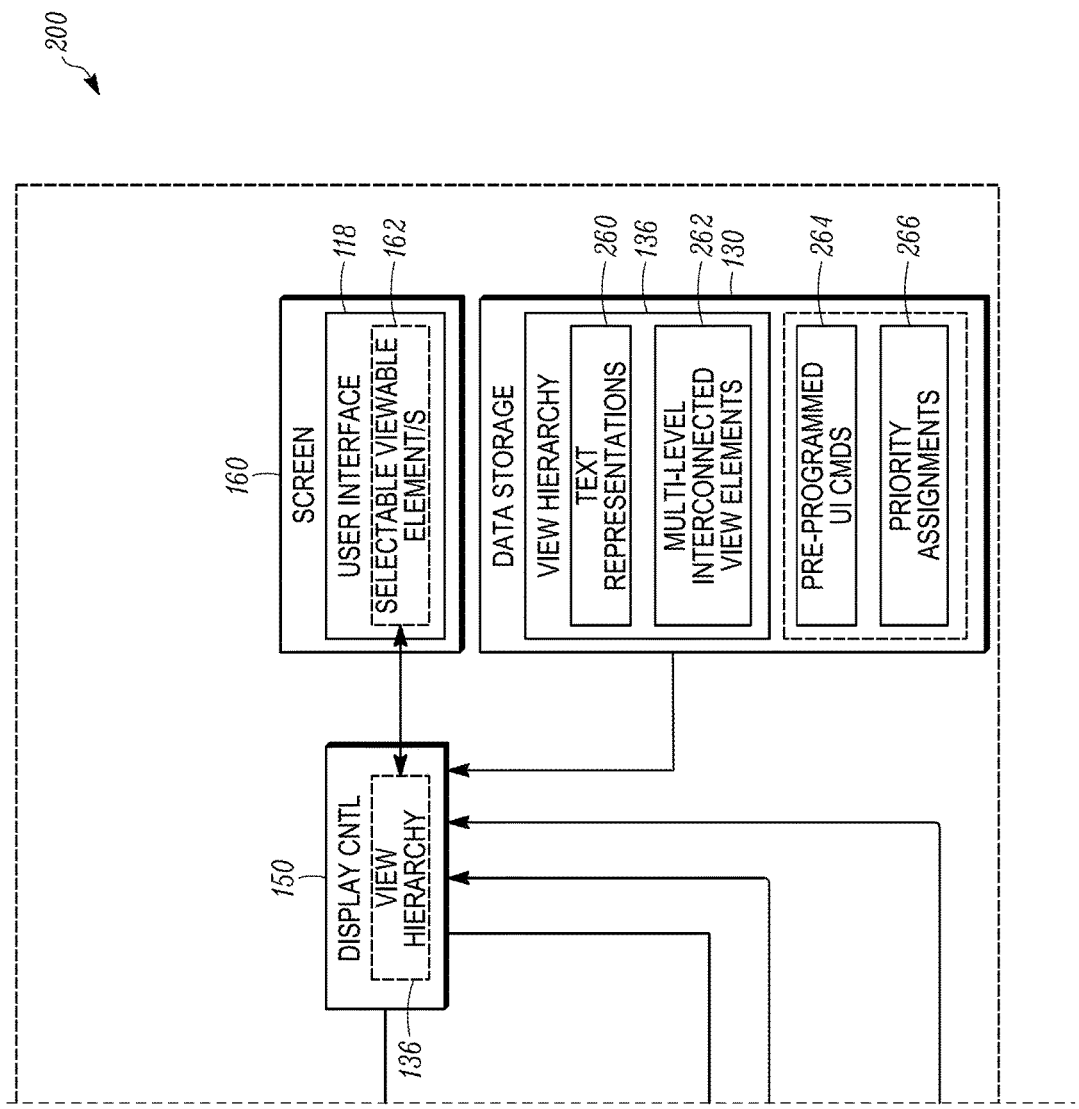

In one or more embodiments, the functionality of the described features are implemented via (i) speech recognition engine (to convert speech to text); (ii) View Item Extractor to identify current screen elements; (iii) Natural Language Processing (NLP) engine to map user text to the respective view element; and (iv) synonym engine. FIGS. 2A and 2B illustrate an example viewable screen content interfacing (VSCI) execution environment 200, within which the various functional features of the disclosure can be implemented. VSCI execution environment (VSCI EE) 200 includes several of the components previously introduced in FIGS. 1A and 1B interconnected with directional arrows. These directional arrows are provided to identify generally the directional flow of input data, operational code, communication between components, and processing sequence, according to the example implementation. It is appreciated that different sequencing of the processes can be implemented in alternate embodiments, including omission of some sequences and addition of other sequencing steps. FIGS. 2A and 2B should thus be read as a single example of VSCI EE 200.

As shown at the top left corner, VSCI EE 200 receives as input one or more of audio input 212 from an audio input source 210 or text input 205 from a tactile or manual input component. In FIG. 1A, keypad 144 and tactile components 148 can represent a manual input component. Audio input source 210 can be a person who voices or speaks a word, phrase, or sentence that can be captured by an audio input component associated with the electronic device 100 that supports VSCI EE 200. Audio input 212 is received by microphone 146, generally representative of an example audio input component.

Received speech input is forwarded to speech synthesizer 220, which can include speech-to-text conversion module 120. Speech-to-text conversion module 120 can be communicatively linked or associated with or inclusive of optional language translator 124. When the received speech input is of a different language than a native language in which the VSCI EE 200 processes its downstream operations, as determined by a language identification utility (not shown), speech-to-text conversion module 120 accesses language translator 124 to obtain a translation of the received speech input into the native language of the VSCI EE 200 before completing conversion of the received speech input into text. Speech synthesizer 220 generates text 222 as its output and that output is forwarded to natural language processing (NLP) engine 122. NLP engine 122 searches within NLP dictionary 123 for identifiable words, phrases, or text sequences that are similar to text 222 received as input. As shown by the dashed lines, when a text input 205 is received, that text input can also be optionally forwarded to NLP engine 122 for processing. In one or more embodiments, NLP engine 122 includes keyword extractor 228, which can extract one or more keywords from received input text 222 (or 205) containing multiple words or distinct text sequences. In one or more embodiments, keyword extractor 228 can eliminate connecting words, such as "and" or "or" and/or can remove articles, such as "the" and "an" and/or other common words, from a longer list of words or text sequences.

In one optional step indicated with dashed lines, the word/s or text sequence/s 224 identified by NLP engine 122 can be forwarded to an alternate word database 138 to identify synonyms commonly associated with an identified word from the received input text. Alternate word database 138 then provides one or more alternate words 226 to be utilized, in addition to the identified word/s, as a character sequence 230 that is inputted to the VSCI utility 125. In one alternate embodiment, the VSCI utility 125 forwards the character sequence to alternate word database 138 only when no matching text representation can be found within the view hierarchy 136. In one embodiment, access to an optional alternate word database 175 located at a remote server 225 may also be supported within VSCI EE 200.

As illustrated, character sequence 230 that is determined (at NLP dictionary 123) or identified (at NLP dictionary 123 and/or alternate word database 138) or received as text input 205 is forwarded to VSCI utility 125, which includes functional modules for performing a series of unique processes illustrated by the flow charts and described later in more detail. A first module, text comparator module 240, performs matching and/or mapping of an input character sequence 230 and viewable screen text received from view hierarchy 136. Specifically, VSCI utility 125 retrieves from display controller 150 an electronic file containing the text-representation of a layout of the selectable viewable elements 162 being presently displayed on viewable screen 160. The electronic file of the view hierarchy 136 is loaded from storage 130 prior to generating the user interface 118 presented within screen 160. As shown, included within or associated with the view hierarchy 136 are text representations 260 describing each viewable element presented on screen 160 as well as the location and properties of those viewable elements. Optionally included are multi-level interconnected view elements 262, one or more pre-programmed (general) user interface (UI) commands 264, and priority assignments 266 for conflict resolution.

To enable the extraction of text representations of the selectable viewable elements 162 on screen 160, VSCI utility 125 includes view item extractor 250, which extracts the text representations from view hierarchy 136 and forwards those text representations to text comparator module 240 to be utilized in the comparison against the inputted character sequence 230. Text comparator module 240 includes or has associated therewith a conflict resolution module 242 that (a) handles conflicts that arise when multiple matches are found to the character sequence 230 and (b) handles selection of elements provided in a layered, parent-child or other primary-secondary level configuration. As shown, conflict resolution module 242 includes pre-programmed user interface commands 264, retrieved from storage 130, and multi-level selection (MLS) module 244 that performs selection features for multi-level interconnected view elements 262 provided within view hierarchy 136. The methodology for utilizing these in conflict resolution is described with reference to one or more of the flow charts. When a conflict cannot be resolved based on pre-programmed priorities for resolving such conflicts, VSCI utility 125 can generate an output notification that can be forwarded to one or more output components such as user interface 118, via display controller 150, for visual display of conflict notification. The output notification can also or alternatively be an audible notification transmitted for output by speaker 158. VSCI utility 125 can then receive a user input via one or more of the input component/s 142, which can be similar to those presented in FIG. 1A. After a single text representation has been identified by VSCI utility 125, selection module 255 triggers the selection of the specific element on the viewable screen 160.

Collectively, the above described components and functions of FIGS. 1A and 1B and FIGS. 2A and 2B provide an electronic device including: at least one processor 105; a display 156 coupled to the at least one processor 105 and which presents one or more viewable screens 160 having at least one selectable viewable element 162; and at least one input component 142 that is communicatively coupled to the at least one processor 105 and which enables entry of a first input (e.g., first audio input 212) while a first viewable screen 160 is being presented on the display. Additionally, the electronic device 100 includes a plurality of executable modules, including the viewable screen content interfacing (VSCI) utility, which modules execute on the at least one processor 105 and configure the electronic device 100 to, in response to receipt of a first audio input 212 while displaying a viewable screen 160: access an electronic file (view hierarchy 136) that provides a text representation of one or more selectable viewable elements 162 associated with the viewable screen 160; convert (via speech-to-text converter module 120) the first speech input to a character sequence 230; compare the character sequence 230 to the text representations 260 of each of the selectable viewable elements 162 associated with the viewable screen 160; and in response to detecting a match of the character sequence 230 with at least one text representation 260, (i) select, within the viewable screen 160, a corresponding selectable viewable element 162 whose text representation 260 matches the character sequence 230 and (ii) trigger any action linked to the selecting of the corresponding selectable viewable element 162.

According to the illustrative embodiments, the electronic file is a view hierarchy of the viewable screen. Also, the VSCI utility includes: a view item extractor 250, which extracts the text representation of each selectable element, sub-element, and properties associated with each element, from the view hierarchy 136; and a text comparator 240 that compares the character sequence to the text representation of the element, sub-element, and properties of the element to determine whether the character sequence has an approximate match to the text representation of at least one of the selectable element, sub-element, and properties of the element.

According to one or more embodiments, the at least one selectable element of the viewable screen can include one or more of (i) a navigational function associated with the viewable screen, (ii) a functional command associated with at least one of the electronic device, the viewable screen, and content within the viewable screen, (iii) a selectable affordance presented on the viewable screen such as a notch for a virtual knob or dial, a handle of a virtual slider, a virtual toggle switch, or a virtual button, (iv) a text sequence, word, or sequence of words presented on the viewable screen having alphanumeric characters, and (v) symbols presented on and/or associated with the viewable screen representing a secondary function applicable to the viewable screen. When the selectable element is a visually represented element of the viewable screen, the VSCI utility 125 configuring the electronic device to select a corresponding selectable element comprises: the utility configuring the processor to highlight the corresponding selectable element on the viewable screen to provide visual feedback of the selection of the selectable element. Additional functionality presented by execution of various executable modules and specifically the VSCI utility 125 within electronic device 100 are described herein and presented within the description of the graphical user interfaces of FIGS. 3-8 and the flow charts (FIGS. 9-12).

FIGS. 3, 5, 7, and 8 illustrate screen captures of a viewable screen and its associated view hierarchy, in accordance with one or more embodiments. In each figure, the viewable screen is presented on the left side of the screen capture, while the corresponding view hierarchy is presented on the right side of the screen capture. These viewable screens are of different user interfaces of a smart phone. According to one aspect of the disclosure, the devices in which the viewable screens are presented operate with an operating system that supports use of view hierarchies to control the graphical presentation of content on the device's display.

Figures 3, 3A:
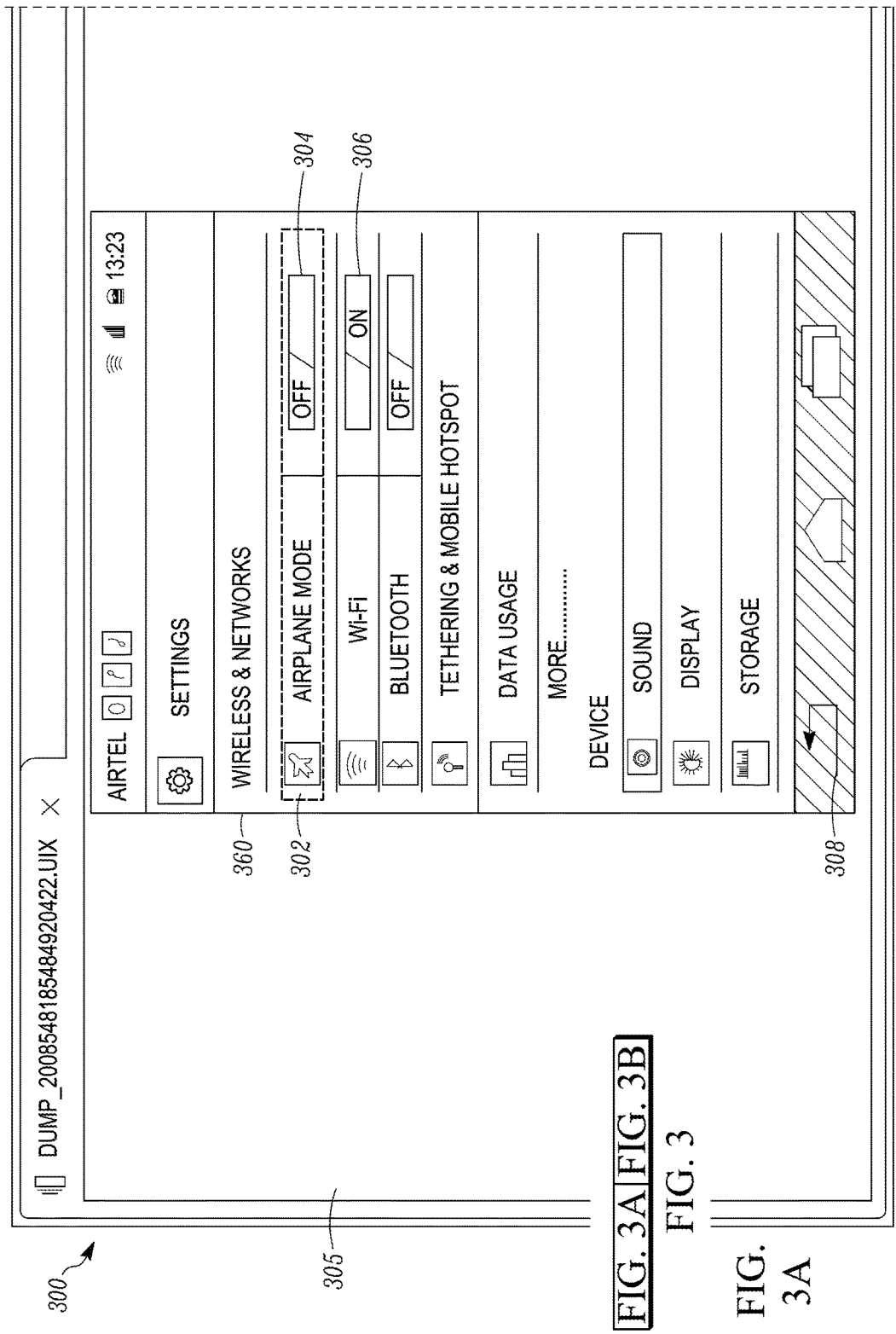
FIGS. 3A and 3B illustrate a first example of an extended display with a viewable screen and corresponding view hierarchy that can be utilized to support use of text and/or speech input to enable selection of specific elements available within the viewable screen, according to multiple embodiments.
Figure 3B:
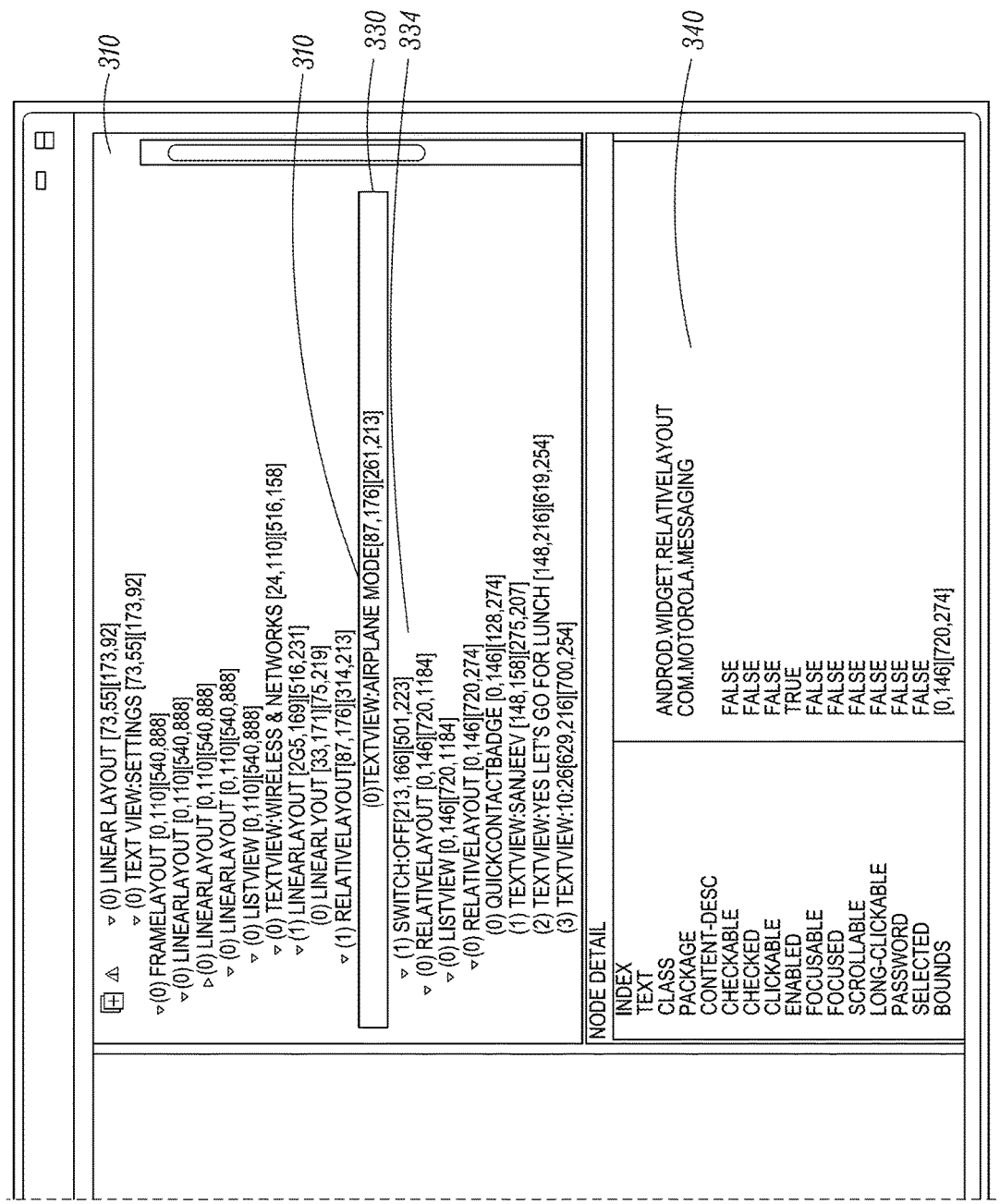

Referring first to FIGS. 3A and 3B, screen capture 300 has viewable screen 360 and corresponding view hierarchy 336. Viewable screen 360 is a screen capture of a settings page on the smart phone, which page is accessible from a home screen (not shown) by selection of a settings icon or settings menu item. For purposes of the description which follows, viewable screen 360 is hereafter referred to as settings screen 305. Settings screen 305 includes a plurality of viewable elements separated into several sub-menu identifiers, of which "wireless & networks" and "device" are illustrated. Notably, the wireless & networks sub-menu displays icons representing selectable options or elements within that general sub-menu category. Among the displayed icons of selectable options are Airplane mode, Wi-Fi, Bluetooth, Tethering & Mobile Hotspot, Data usage, and a selectable list expansion option "More . . . ". Associated with the first three display icons are on-off sliding bar indicators 306 and 304. Specifically, sliding bar indicator 304 for airplane mode 302 is indicated as being in the off position, with the words "off" visibly shown on the bar, while sliding bar indicator 306 for Wi-Fi is shown as being in the "on" position. Settings screen 305 also includes a series of global system functions for each screen that is not a home screen, such as selectable return indicator 308 shown as a sideways U with a top directional arrow. Those familiar with a basic smartphone can appreciate what each of these selectable global system functions represent and what function is performed when each one is selected. At the top of settings screen 305 is also a status bar, with general notification icons, as is known in the art. These notification icons are examples of viewable, non-selectable elements 163.

Notably, settings screen 305 indicates a selection of Airplane mode 302 via use of a highlight box around the words. The corresponding view hierarchy 336 includes a series of lines of text identifying content and format and layout corresponding to each of the elements presented within settings screen 305. As shown, view hierarchy content 310 includes at least one line 330 corresponding to the presentation of the airplane mode icon and words "airplane mode" on settings screen 305. Airplane mode text view 332 is a textual representation of the airplane mode icon 302 and text presented within settings screen 305. Below the text representation is also an interrelated entry 334 (i.e., a child object of Airplane mode) for the sliding bar display value 304. Here the sliding bar operates as a switch with one of two positions, on or off. Located below the main view hierarchy entries is properties view 340 that provides a set of properties and other details associated with the highlighted Airplane mode text view 332.

Figure 4A:
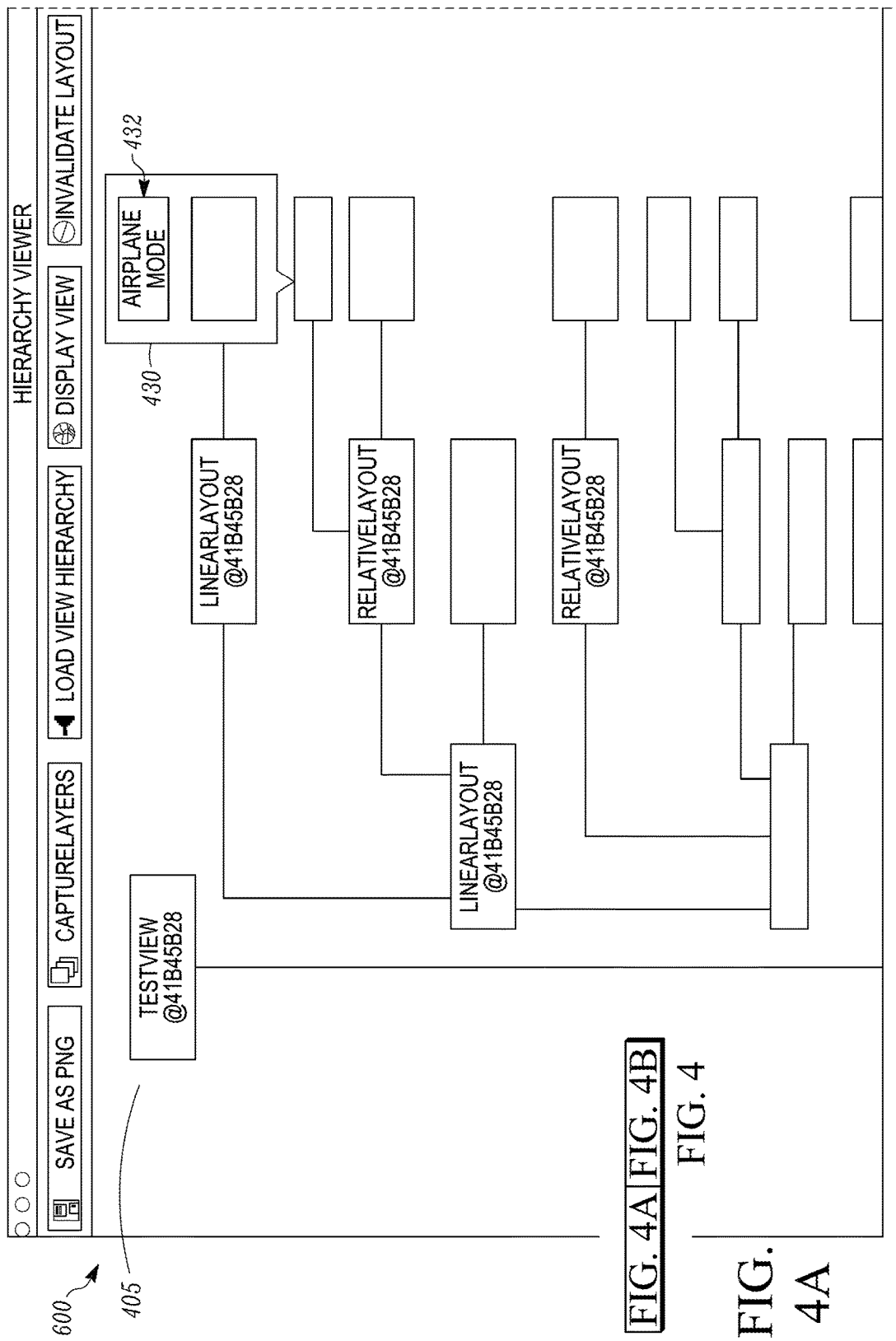
FIGS. 4A and 4B provide a screen shot of an example interface of a hierarchy viewer for FIGS. 3A and 3B showing relative placement of multiple elements within a viewable screen to represent an expanded graphical view hierarchy, according to some embodiments.
Figure 4B:
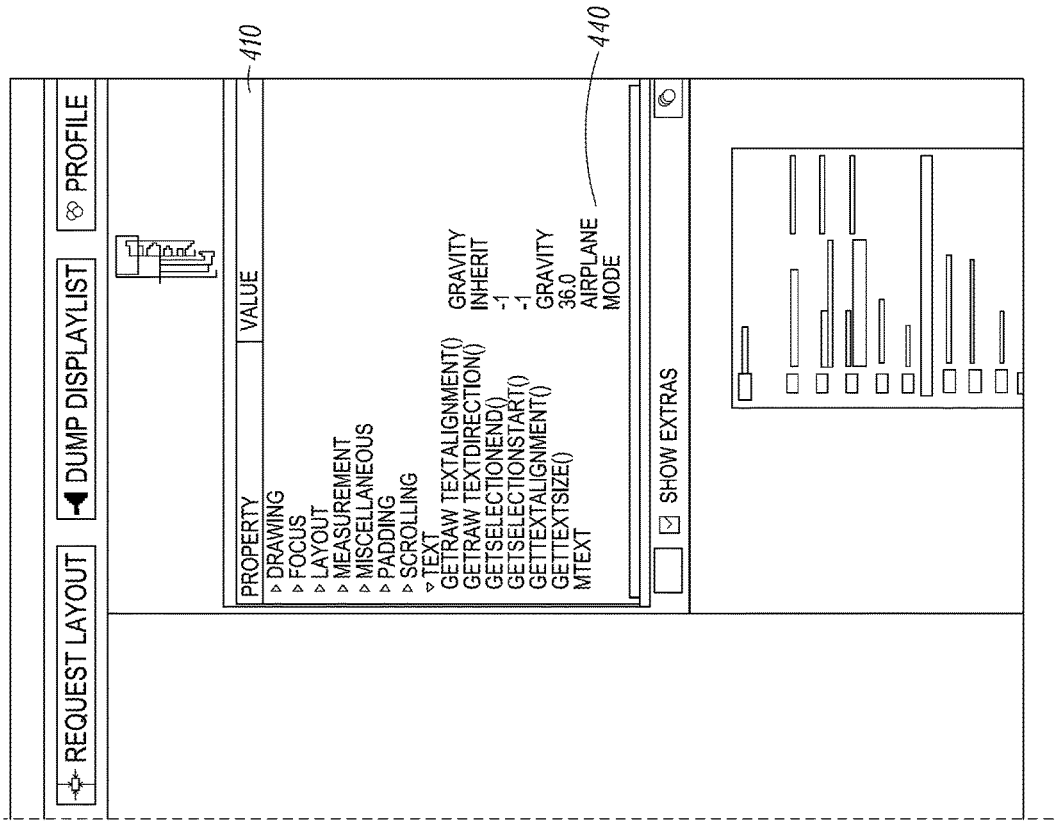

Additional details of the view hierarchy of FIGS. 3A and 3B are illustrated within hierarchy viewer interface 400 of FIGS. 4A and 4B, which provides a more detailed block diagram representation showing links between different levels of the view hierarchy 336 of FIGS. 3A and 3B. To the left of the interface 400 is the graphical format image 405, while a properties child window 410 is shown to the right. A bubble of block 430 represents the Airplane mode icon 302 (FIG. 3A) and includes an internal text representation 432 of "Airplane mode". Also, the sliding bar 304 (FIG. 3A) is represented by a block, presenting selectable content. Property window 440 of interface 400 includes several text contents, one of which is "Airplane mode". In this manner, view elements can be compared to audio or text inputs using a view hierarchy.

Figure 5B:
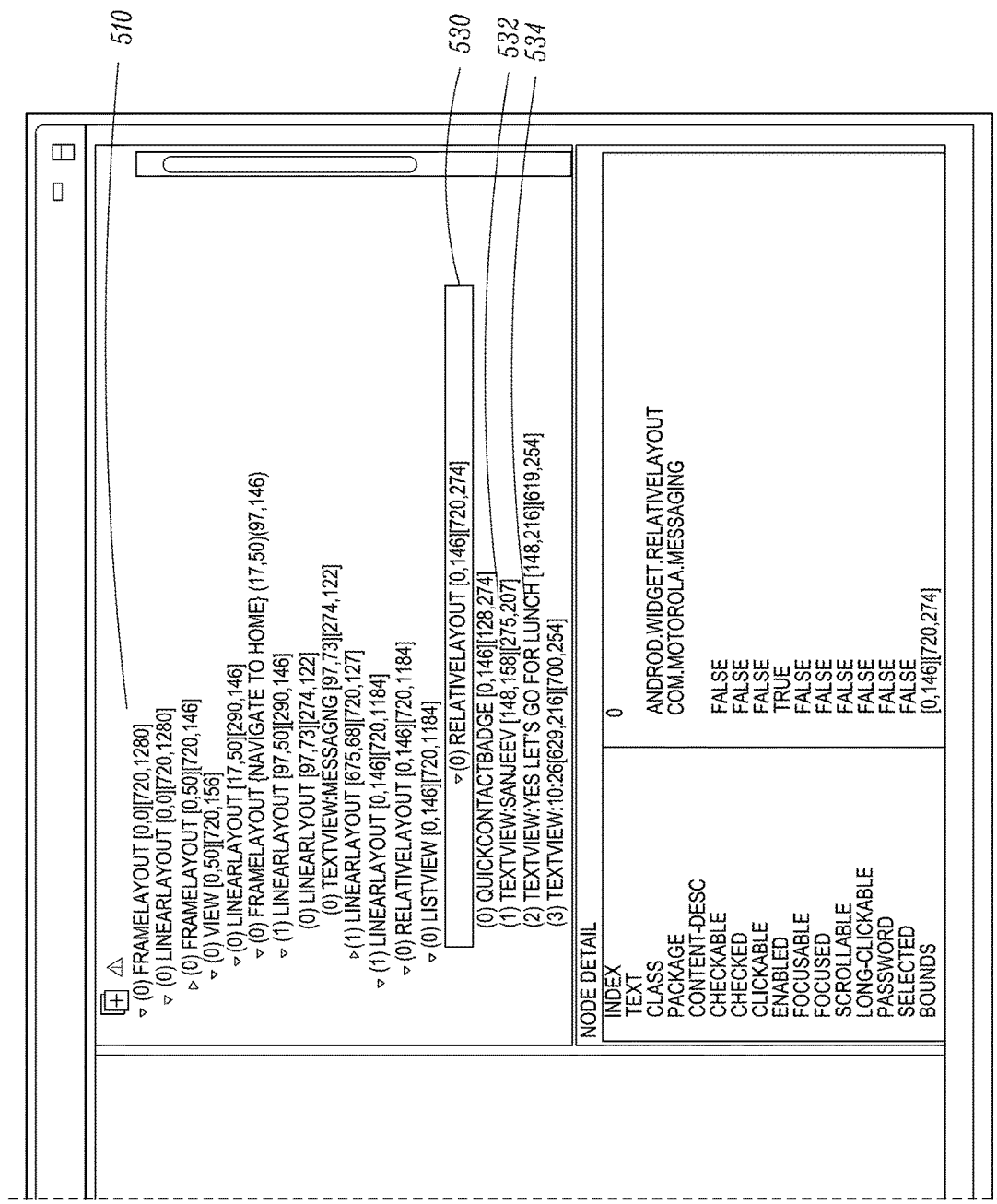
Figure 6A:
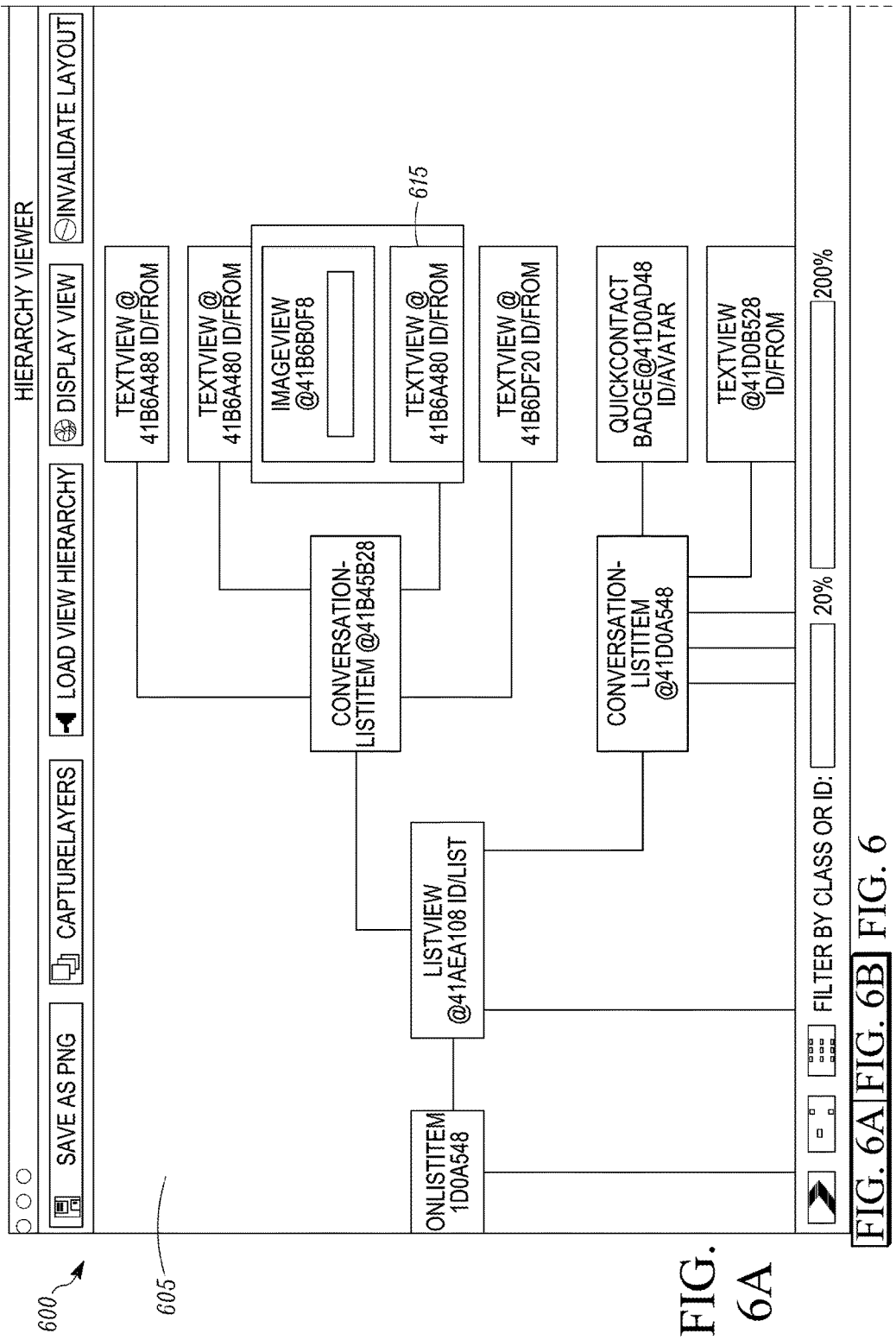
FIGS. 6A and 6B provide a screen shot of an example interface of a hierarchy viewer for FIGS. 5A and 5B showing relative placement of multiple elements within a viewable screen to represent an expanded graphical view hierarchy, according to some embodiments.
Figure 6B:
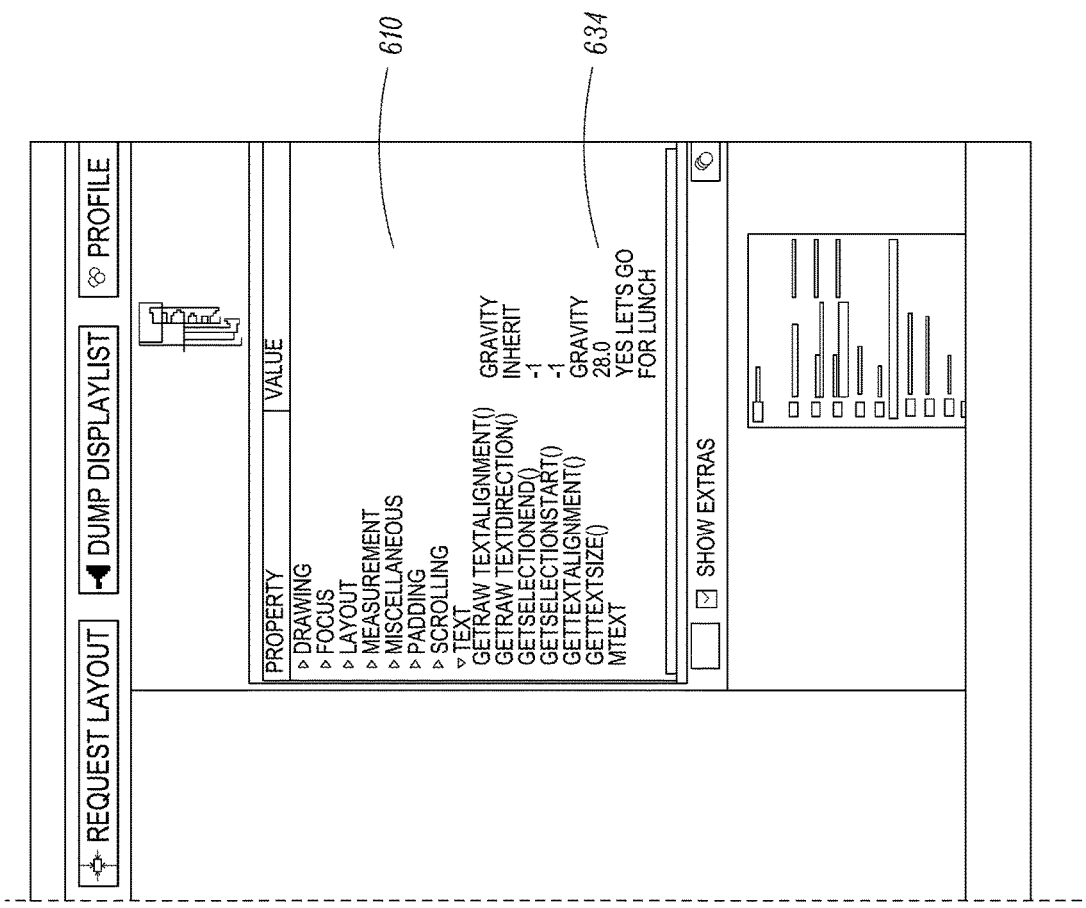

FIGS. 5A and 5B present another screen capture 500 that includes a messaging screen 505 and corresponding messaging screen view hierarchy 510. Messaging screen 505 includes a listing of received text messages from different contacts or phone numbers. A first text message 506 is illustrated as being highlighted. First text message 506 is a message received from Sanjeev that includes the message "Yes let's go for lunch". Shown highlighted within corresponding messaging screen view hierarchy 510 is the hierarchy path 530 that includes both a first text representation 532 of the name Sanjeev as well as a second text representation 534 of the message "Yes let's go for lunch". FIGS. 6A and 6B then provide additional details of the view hierarchy 510 of FIG. 5B in a graphical format image 605, which shows the link between different levels of the message screen view hierarchy 510 of FIG. 5B. Hierarchy viewer interface 600 provides graphical format image 605 and properties child window 610 inserted at the right thereof. A highlighted block 615 represents the selectable elements of the text message from Sanjeev illustrated on messaging screen 505 (see FIG. 5A). Again, properties child window 610 includes several text contents, one of which presents the text representation 634 of "Yes let's go for lunch".

Figure 7A:
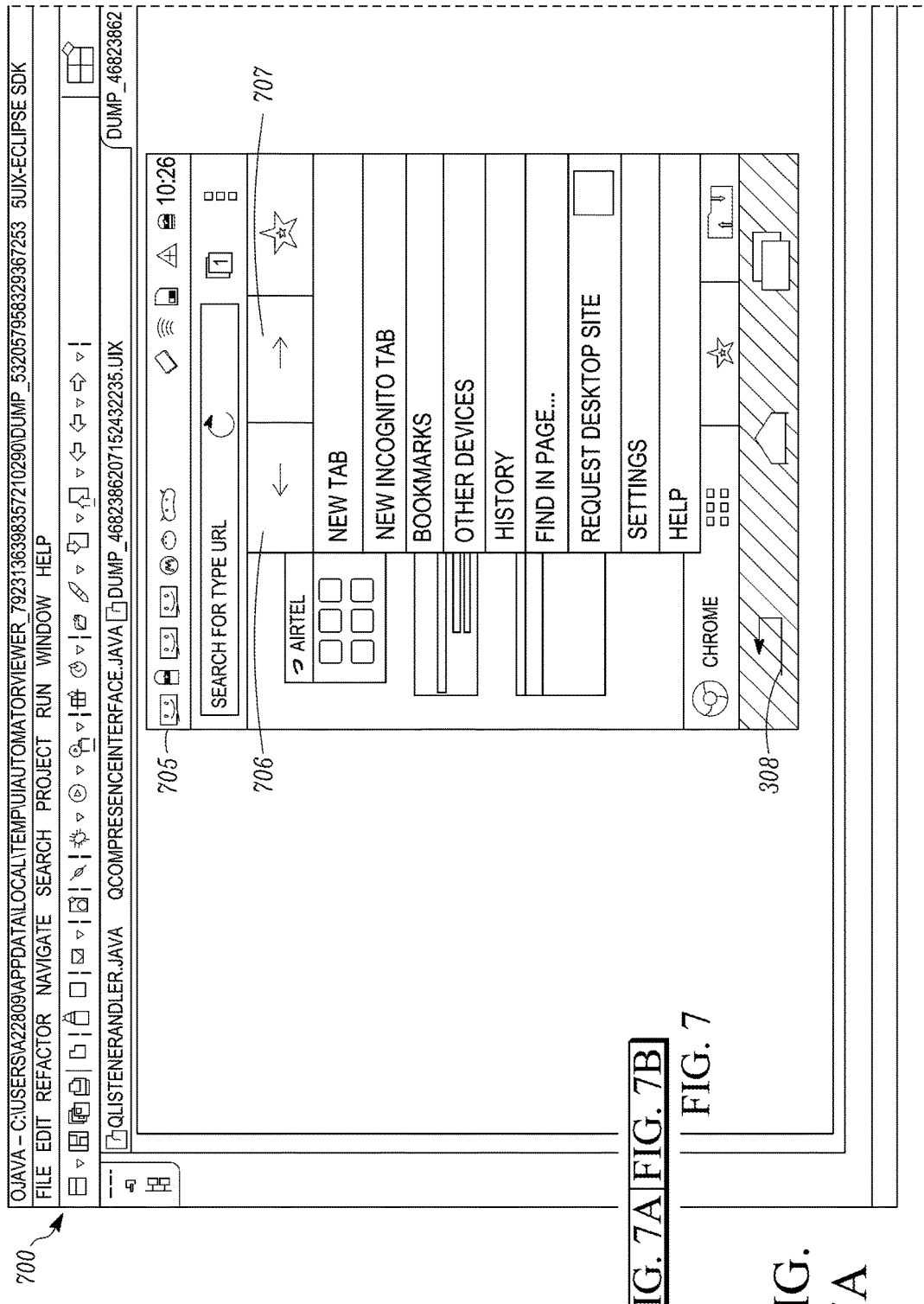
FIGS. 7A and 7B illustrate a third example of an extended display with a viewable screen and corresponding view hierarchy that can be utilized to support use of text and/or speech input to enable selection of specific elements available within the viewable screen, according to multiple embodiments.
Figure 7B:
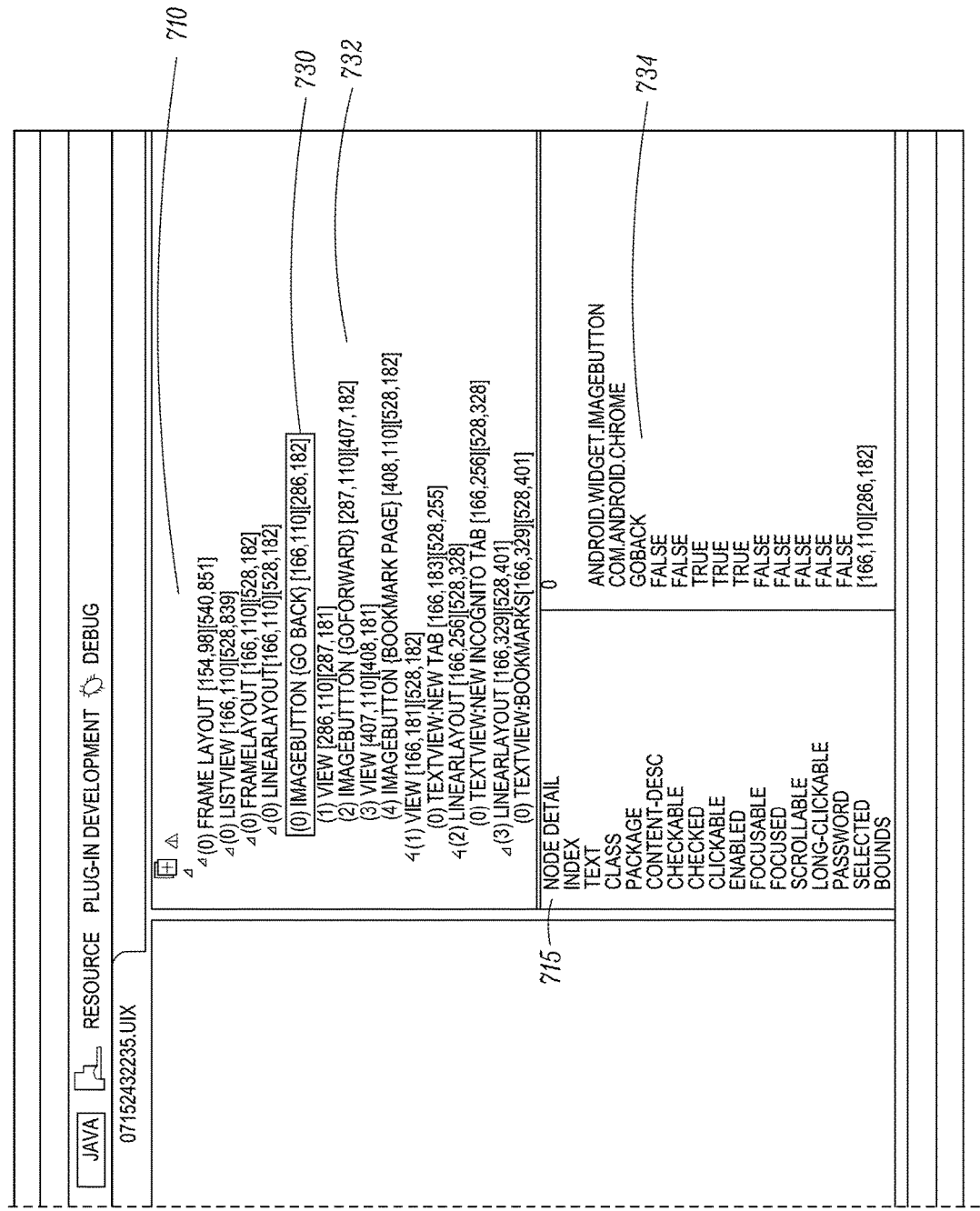
Figure 8A:
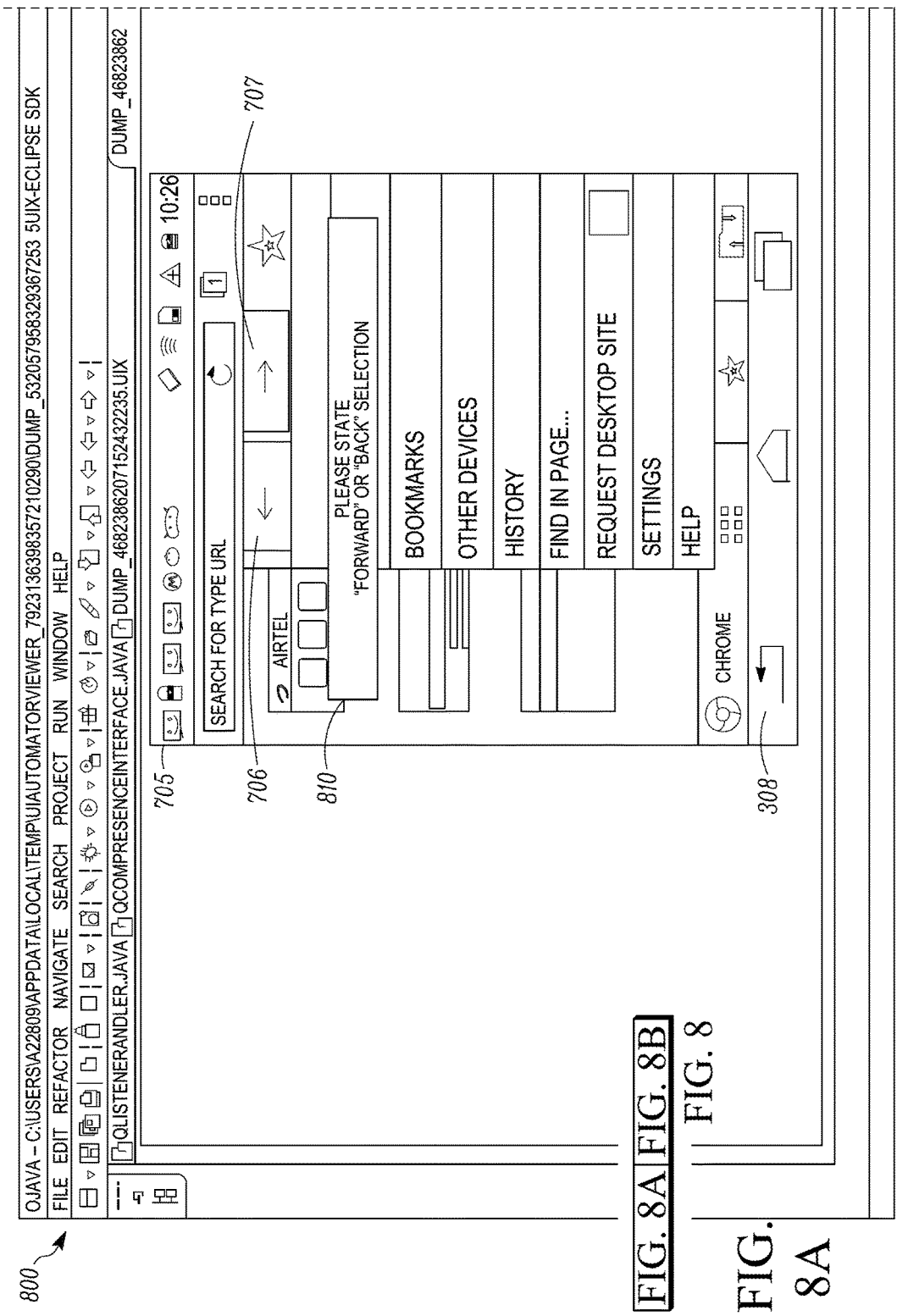
FIGS. 8A and 8B illustrate a fourth example of an extended display with a viewable screen and corresponding view hierarchy that can be utilized to support use of text and/or speech input to enable selection of specific elements available within the viewable screen, according to multiple embodiments.
Figure 8B:
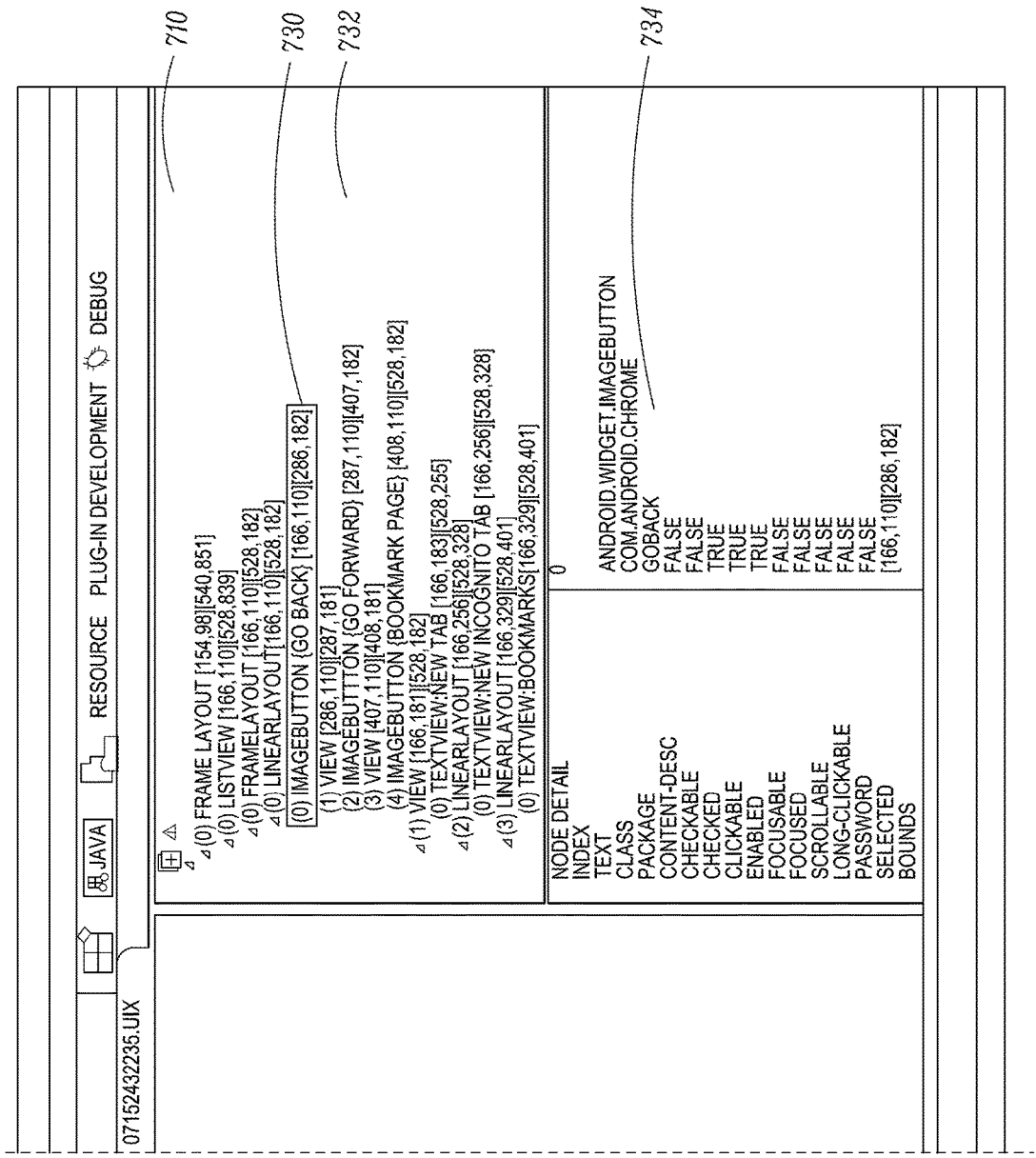

FIGS. 7A and 7B present an additional example of a screen capture 700 highlighting the use of speech input to select a navigation button, namely a Go back navigation button 706 within a browser menu screen 705. The "Go back" navigation button 706 is represented within corresponding view hierarchy 710 by text representation "Go back" 730. This representation is further presented within content description 734 of the node detail view 715. During processing, VSCI utility 125 compares the input character sequence to all possible content within the view hierarchy 710 that can provide a possible match to the character sequence. FIGS. 7A and 7B can also require conflict resolution where the user provides a speech input of "Go to previous screen". In this instance, because the phrase "Go to previous screen" does not match any view hierarchy text for the current screen, and the word "go" is a matching character sequence with both navigation options of "Go back" 730 and "Go forward" 732, conflict resolution module 242 (FIG. 2A) would need to determine which of the two options has a higher priority and/or if the priorities are equal, issue a notification prompting the user to provide a selection of one of the two possible options. In this instance, as shown by screen capture 800 of FIGS. 8A and 8B, the two options (i.e., "go" navigation buttons 706 and 707) can be highlighted and a notification 810 provided with the specific words "forward" and "back" flashed on-screen or audibly presented to the user. Receipt of a subsequent speech input of "forward" will cause the VSCI utility 125 to highlight just the "go forward" navigation button 707 and trigger execution of the system function to navigate forward in the browser history.

One benefit to the above described use of the view hierarchy from the hierarchy viewer is that the user's ability to control actions and selections on the screen is no longer limited to pre-programmed commands for the particular screen. While the disclosure does allow for the standard pre-defined set of stored commands and menu options to be triggered or selected via voice input, the disclosure further enables all other selectable elements displayed within the screen to be selected, without any pre-programming of the elements into a speech response module. The disclosure thus works on creating dynamic actions based on the current view content. No pre-defining of the action set is required, and the functionality is fully scalable to cover all possible actions for any screen presented on the device, including any new screens that are added in the future, whether due to firmware upgrade or on installation of a new application.

As an example, while reading through an email, the user no longer has to manually select menu and then tap on "Report spam", as would be required for conventional systems when the application specific menu option selection is not available through pre-defined speech based commands. With the various aspects covered by the present disclosure, the VSCI utility 125 can enable access to this function using speech interaction with the device and specifically using the content/suggested-hint of the menu view element on the current visible screen followed by the pop-up list of menu items. As described, the VSCI utility 125 maps speech input with the extracted content from the current view hierarchy of the visible screen to identify the specific view element to act on or derive an action on the element, without requiring or being dependent on a pre-defined action set.

Figure 9A:
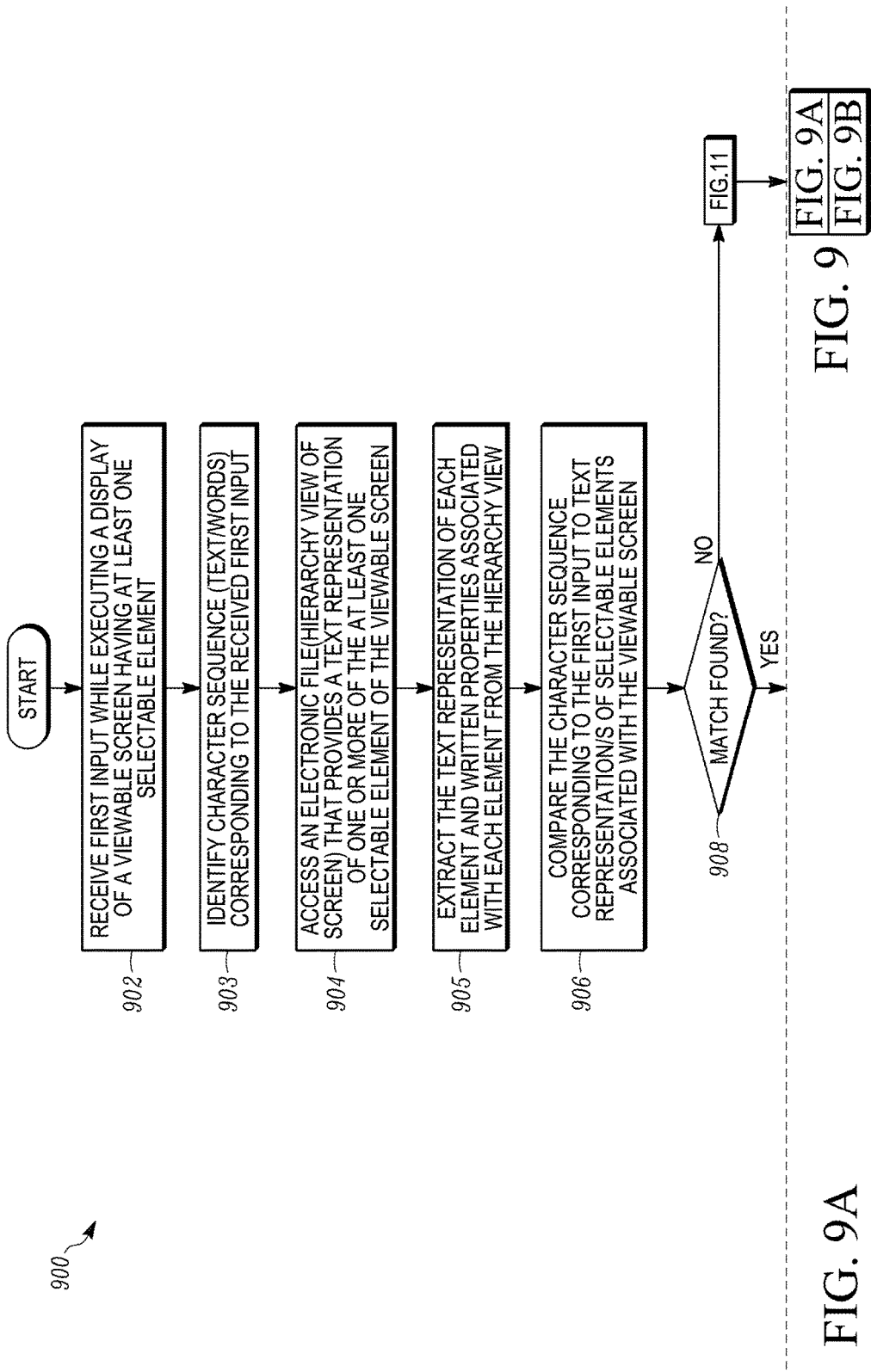
FIGS. 9A and 9B illustrate a flow chart of an example method for selecting elements of a viewable screen based on comparison of (i) the character sequence from one of a direct text input and a derived text sequence (word) from a speech input with (ii) a text representation of the elements within a view hierarchy of the viewable screen, in accordance with one or more embodiments.
Figure 9B:
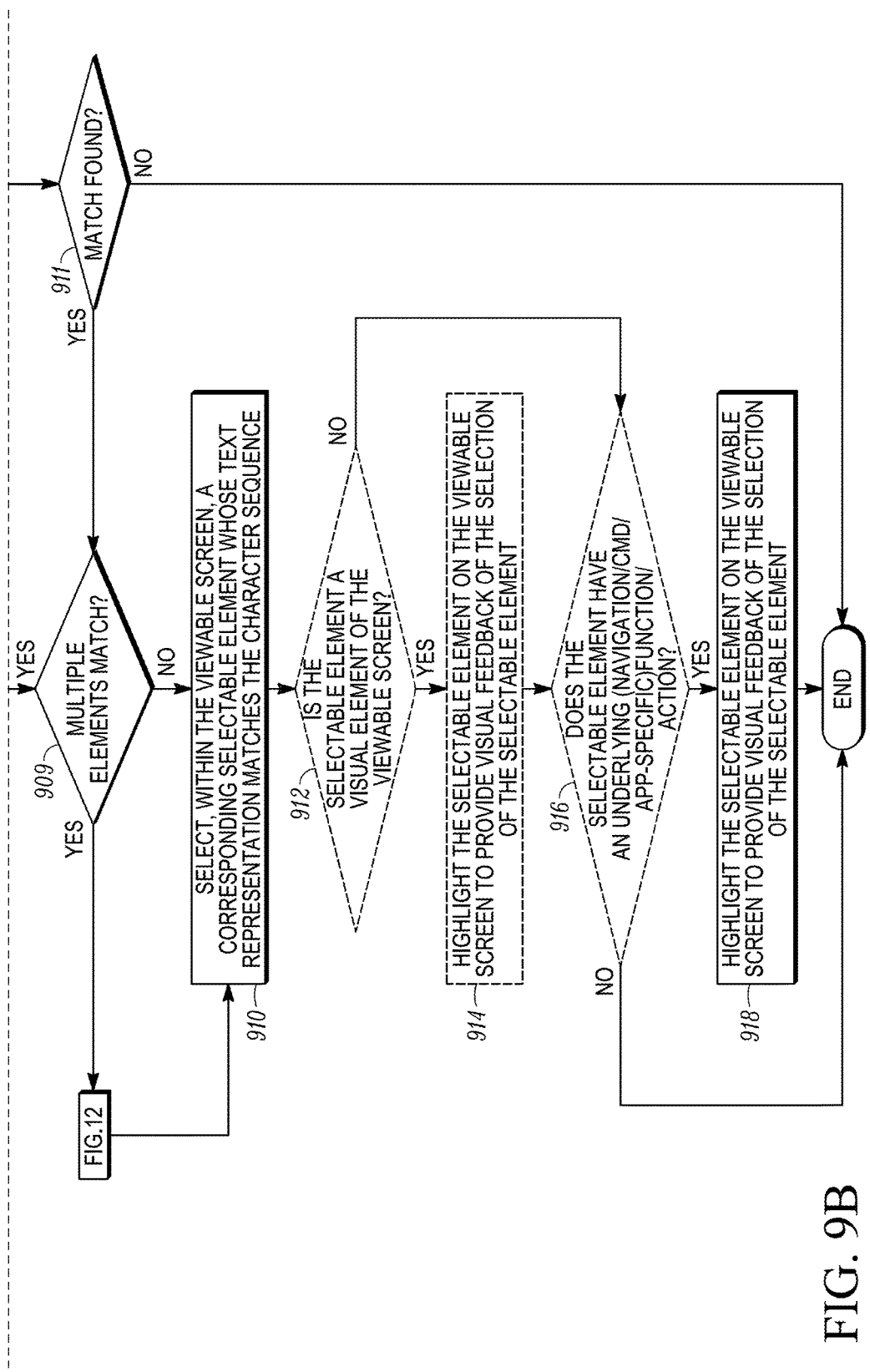
Figure 10B:
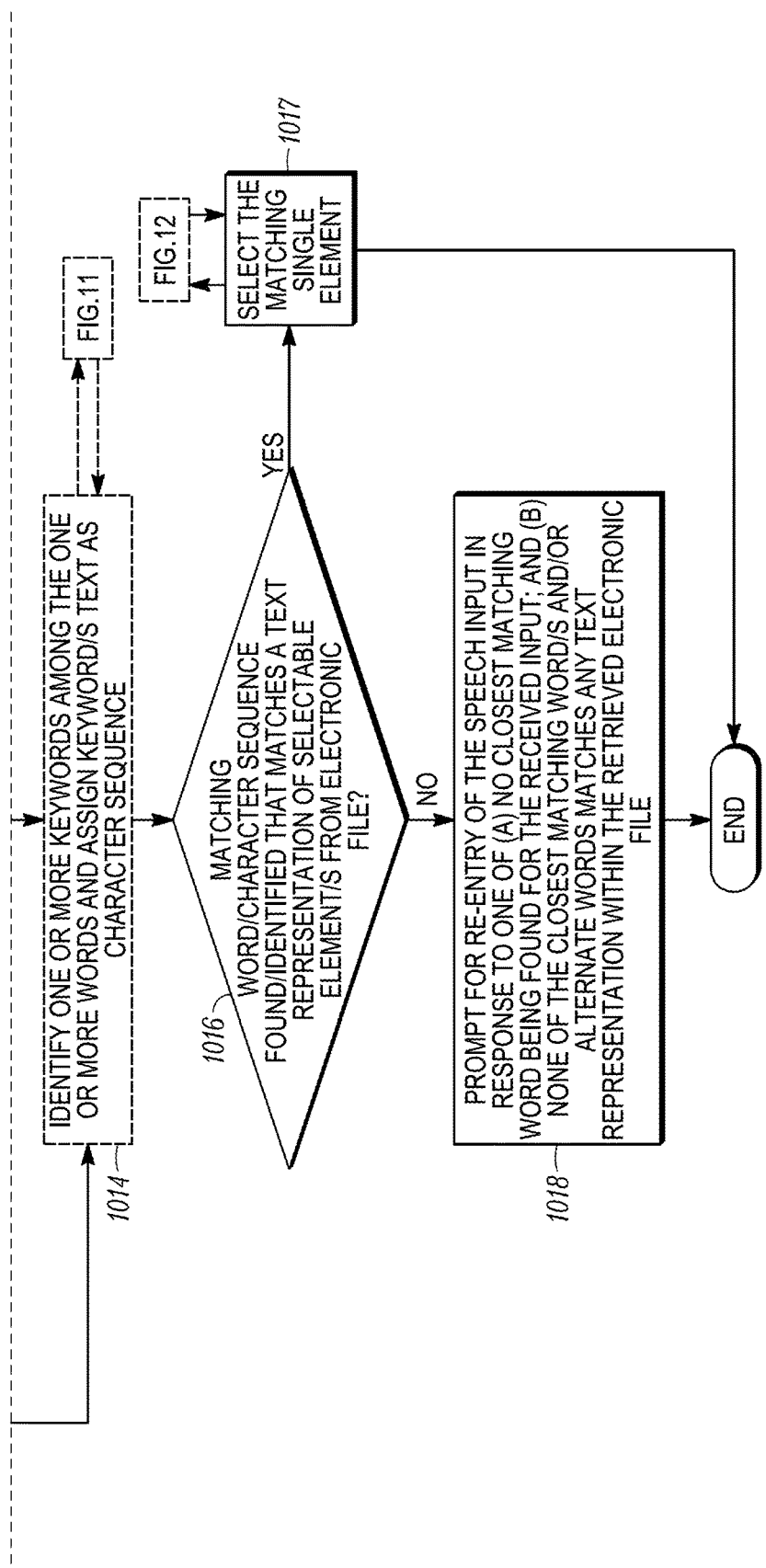
Figure 11:
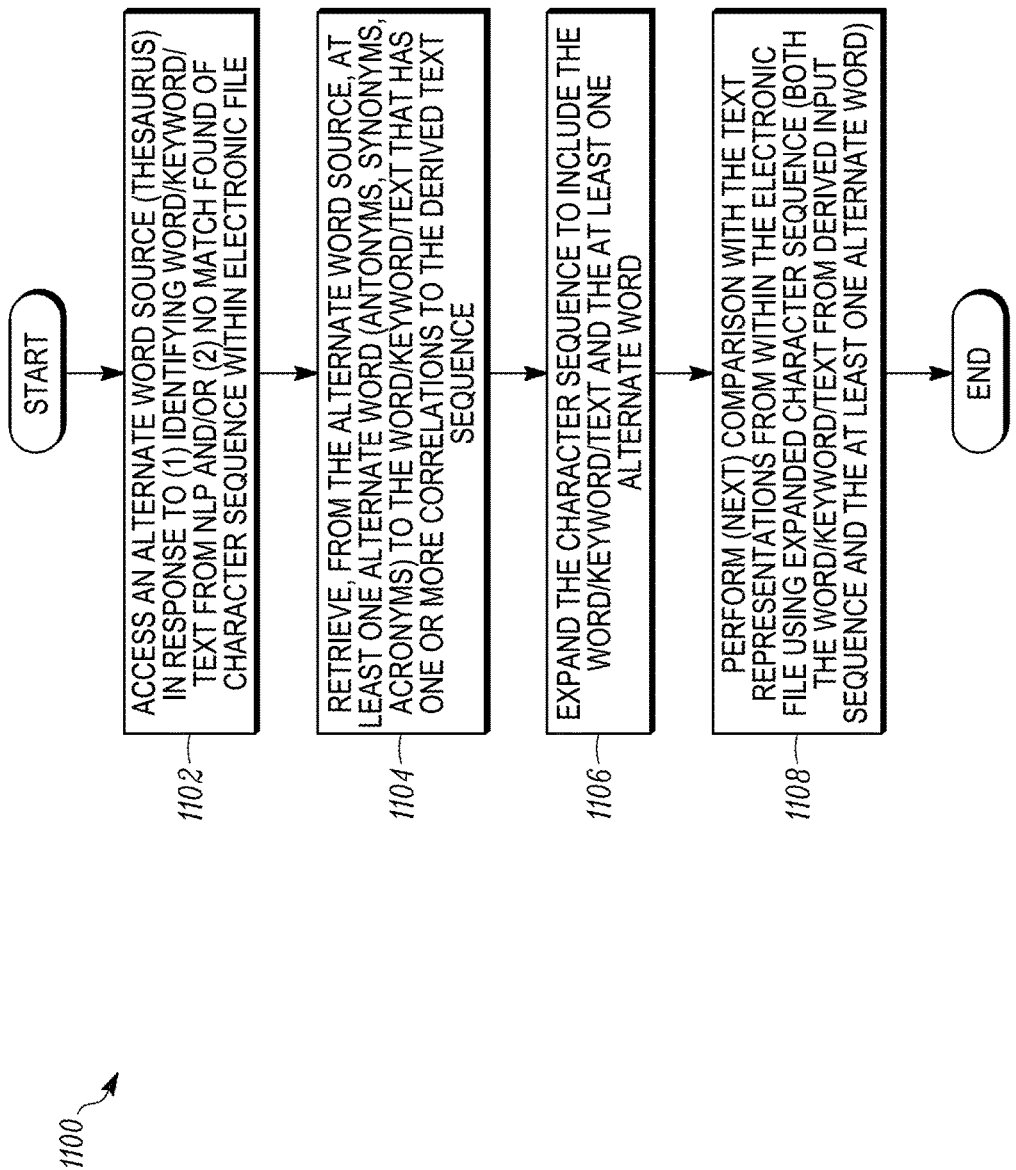
FIG. 11 illustrates a flow chart of a method for extending the text based comparison to include alternate words derived from the received text or speech input and to include properties associated with the elements, according to multiple embodiments.
Figure 14:
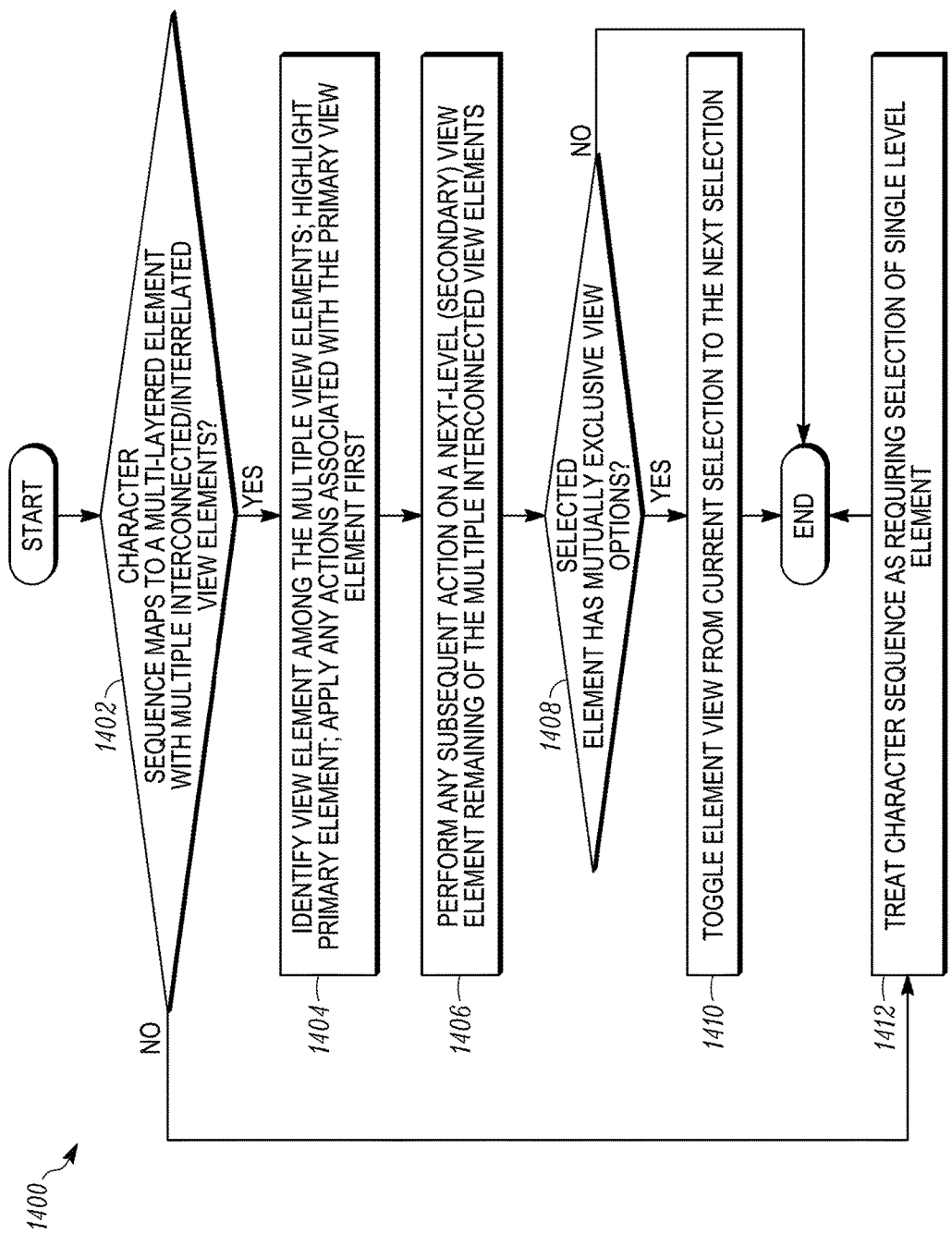
FIG. 14 is a flow chart illustrating a method for handling a selection of multi-layered viewable elements and elements having mutually exclusive options, according to one or more embodiments.
Figure 15:
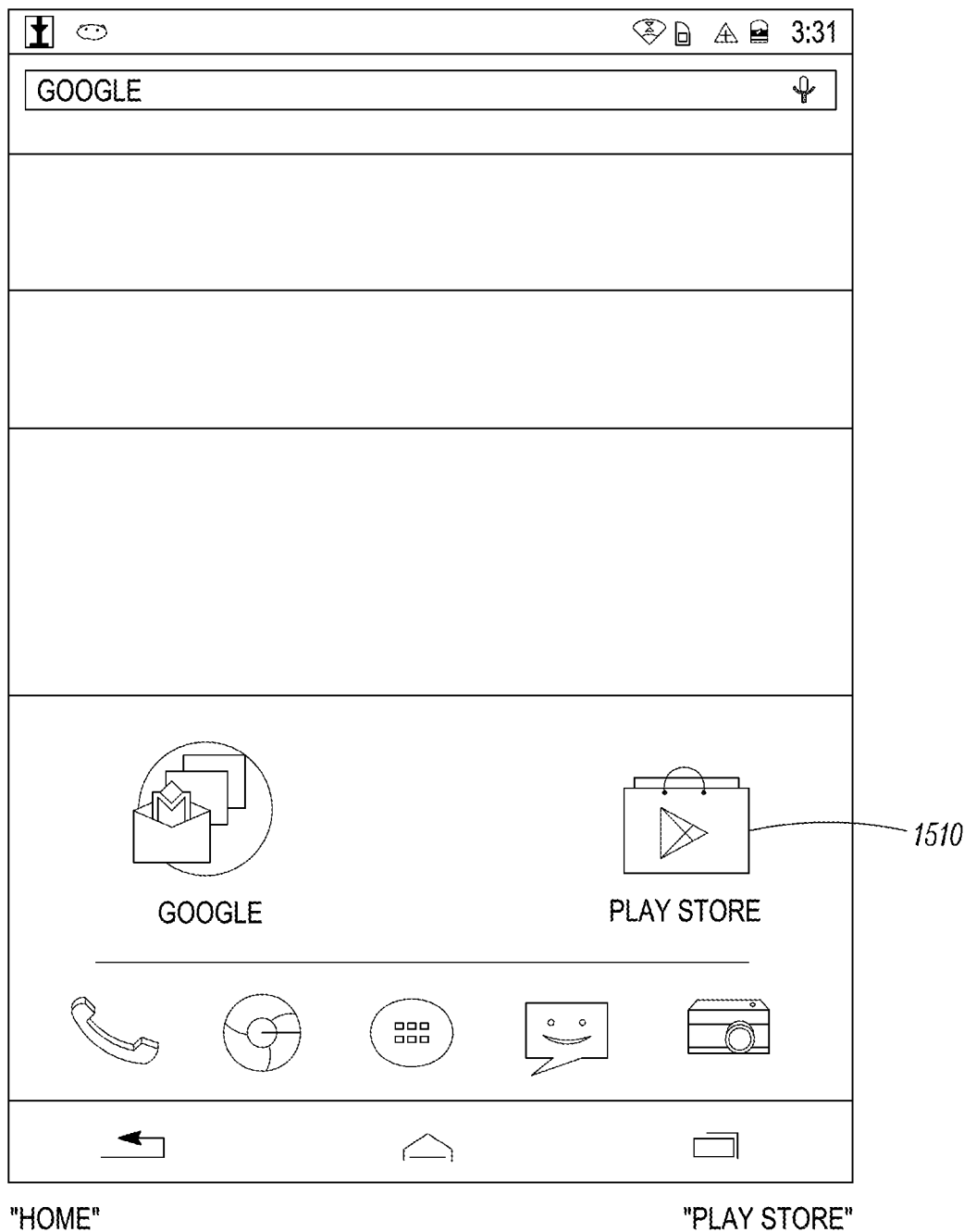
FIGS. 15-23 present a sequence of screen images showing the navigation and/or transition from one screen to a next screen based on receipt of voiced input that is correlated to actual viewable elements on the screen, utilizing the view hierarchy of the displayed screen elements, according to one or more embodiments.
Figure 16:
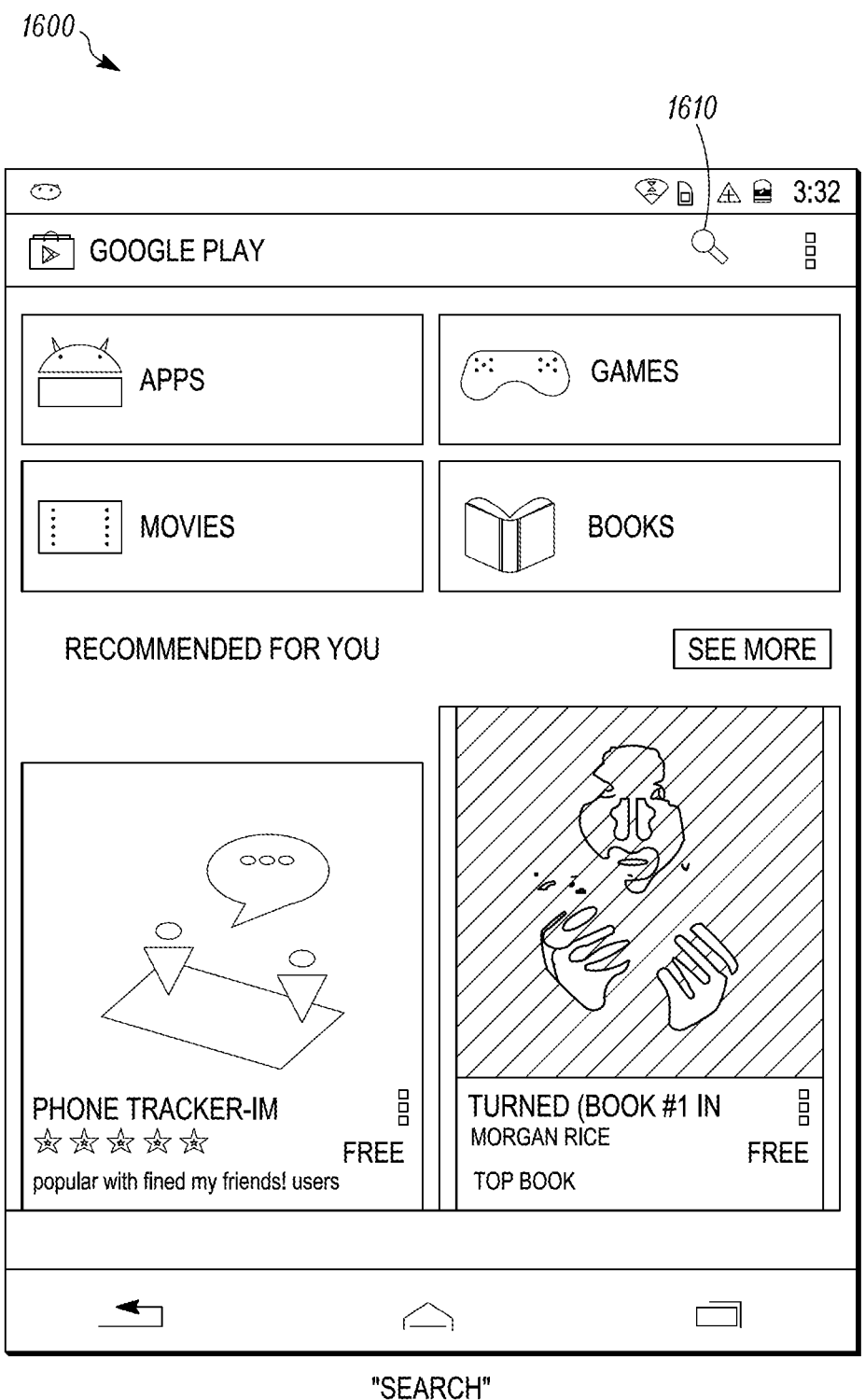
Figure 17:

Turning now to the flow charts, FIGS. 9-12 and 14 present flow charts illustrating various methods (900, 1000, 1100, 1200, and 1400), by which the functional processes performed by VSCI utility 125 and other functional modules can be completed, according to a plurality of different embodiments. Specifically, FIGS. 9A and 9B present an overall view of the user interfacing that supports both text and speech inputs. FIGS. 10A and 10B describe an implementation of the user interfacing where the user input is speech. FIG. 11 is a thesaurus subroutine that may be useful if the recognized text or speech is not matched to an element of an electronic file (e.g., a view hierarchy element). FIGS. 12A and 12B provide a conflict subroutine that may be useful if the recognized text or speech matches more than one element of the electronic file. Finally, FIG. 14 illustrates a method for handling selection of multi-layered viewable elements and elements having mutually exclusive options. Each of the methods are described from the perspective of processor/s 105 or other processing component of electronic device 100 (FIGS. 1A and 1B) executing code from VSCI utility 125 and the other functional modules presented within VSCI EE 200 (FIGS. 2A and 2B) to provide specific functions using a combination of received input and text representations from a view hierarchy 136 including selectable viewable elements 162 presented on/within a viewable screen 160 being presented on display 156 of electronic device 100. In each of the flow charts, dashed boxes represent optional components, which can be implemented in some embodiments and not included in other embodiments. Collectively, the methods of the flow charts in FIGS. 9-12 and 14 enable screen-specific user interfacing with elements of viewable screens presented by an electronic device.

Method 900 of FIGS. 9A and 9B begins at start block and includes the electronic device 100 receiving 902 a first speech input while displaying a viewable screen having at least one selectable element. The method 900 includes identifying 903 a character sequence corresponding to and/or representing the received first speech input, as described with reference to FIGS. 2A and 2B. Method 900 then includes accessing 904 an electronic file that provides a text representation of one or more of the at least one selectable viewable element. In one or more embodiments, the electronic file is a view hierarchy of the viewable screen.

Method 900 further includes extracting 905 the text representation of each selectable element, sub-element, and properties associated with each element, from the view hierarchy, and then comparing 906 the character sequence to the text representation of each of the selectable elements associated with the viewable screen. The method 900 also detects 908 whether or not a match was found from the comparing process. Failure to find a match of the character sequence within the text representations of the selectable elements of the viewable screen triggers the processes of method 1100 (illustrated by FIG. 11). After the method 1100, the method 900 detects 911 if a match was found.

In response to detecting 909, 911 a match of the character sequence with at least one text representation, method 900 includes determining at decision block 909 whether there are multiple selectable viewable elements that match the character sequence. When multiple selectable viewable elements match the character sequence, method 900 triggers the processes of method 1200 (illustrated by FIGS. 12A and 12B) to resolve the conflict and ultimately select the appropriate selectable viewable element. When the conflict is resolved, or if there is no conflict, method 900 then includes the processor of the electronic device (i) selecting 910, within the viewable screen, a corresponding selectable element whose text representation matches the character sequence and (ii) triggering 918 any action linked to the selecting of the corresponding selectable element. Method 900 then proceeds to the end block.

Within the illustrated flow chart, method 900 includes several optional blocks presented as processes that can occur prior to or concurrently with triggering 918 the action. As shown, prior to triggering 918 the action, method 900 can include determining 912 whether the selectable element is a visual element of the viewable screen and, in response to the selectable element being a visual element, method 900 provides highlighting 914 the corresponding selectable element on the viewable screen to provide visual feedback of the selection of the selectable element. Further, method 900 can also include a determination 916 of whether the selectable element has an underlying function or action after the selectable element is identified as the element being selected by the received input. Triggering 918 the performance of the underlying function or action can then be performed in response to a positive determination 916 YES prior to the end block. A negative determination 916 NO results in the method proceeding to the end block. From the end block, the method 900 may return to the start block to receive another input.

Method 1000 is specific to receipt of speech input and seeks to match audible inputs to selectable viewable elements on the presented viewable screen. Method 1000 of FIGS. 10A and 10B begins at start block and proceeds to block 1002 at which the first input (of method 900) is a speech input (versus a text input), and method 1000 includes receiving the speech input from a speech input component, such as the microphone 146. When the input received is speech input, method 1000 includes activating 1004 a speech recognition engine to decipher the received speech input and converting 1006 the deciphered speech input into corresponding text via a speech-to-text converter 120 to generate the derived text sequence. Method 1000 further includes identifying or extracting 1008 one or more words from within the corresponding text using a natural language dictionary (NLD) 123. Method 1000 includes determining 1010 whether there are any NLD words 224 found or identified from the received speech input, i.e., whether the speech is decipherable and includes actual words in the language of the electronic device 100 or words in another language that have been translated. In response to not identifying any NLD word/s within the corresponding text derived from the received speech input, method 1000 optionally includes determining 1012 a text sequence or closest matching word that has a similar acoustic sound to the received speech input and assigning that text sequence as the character sequence 230. However, in response to extracting the one or more words, method 1000 can optionally include identifying 1014 at least one keyword from the one or more words to utilize as the character sequence that is compared against the text representation. In one embodiment, method 1000 can transition to FIG. 11 at which an alternate word database is accessed to retrieve alternate words to the at least one keyword identified 1014.

Method 1000 provides a determination 1016 of whether the character sequence matches or is similar to a text representation from within the electronic file and which is associated with or corresponds to one of the selectable elements. When a match is found, method 1000 includes selecting 1017 the matching element, when only a single matching element is found. However, in situations where multiple matching elements are identified, method 1000 can optionally transition to FIGS. 12A and 12B to determine which of the multiple selectable viewable elements should be selected. In one or more alternate embodiments, method 1000 can further include: in response to not finding a complete match of the character sequence within the electronic file, identifying a closest match candidate to the character sequence; presenting the closest match candidate for user confirmation prior to selection; and in response to receiving confirmation of the closest match candidate, selecting a selectable element corresponding to the closest match candidate.

However, in response to the character sequence (or closest match candidate) not matching any of the text representations in the electronic file, method 1000 further includes prompting 1018 for re-entry of a next speech input. Notably, the prompting 1018 can also occur when there are no words identified within the received speech input at block 1010 rather than method 1000 proceeding to optional block 1012. From the end block, the method 1000 may return to the start block to receive another input. This other input may be a re-entry of the speech input in response to the prompting 1018 or the input may be a new speech input.

FIG. 11 describes the sequence for deriving an alternate input (from the received input) using an alternate word database 138 or thesaurus. With the alternate input as the character sequence/s, method 1100 then follows the subsequent process of matching the character sequence input to the selectable viewable elements on the viewable screen. There are two alternate scenarios provided for triggering method 1100. In a first implementation, method 1100 is triggered (e.g., at block 908 in FIG. 9A) when no match is found with the character sequence generated from the received input. In a second implementation, method 1100 is triggered following receipt of the initial speech input, and before VSCI utility 125 performs the comparison of the resulting character sequence (from the received speech input) for a match with the selectable viewable elements on the screen (i.e., at block 1014 in FIG. 10B).

As an example of the two alternate scenarios that would trigger method 1100, receipt of an input word "Delete" within VSCI EE 200 (FIGS. 2A and 2B) is assumed. In the first scenario, as presented in FIGS. 9A and 9B, VCSI utility 125 would first try to match the word "delete" with the selectable viewable elements in the view hierarchy. Then, if no match is found within the view hierarchy, VSCI utility 125 accesses the alternate word database for alternate words that are converted into respective character sequences. VSCI utility 125 then performs a comparison of the returned alternate words (e.g., "trash", "remove") with the text representations of the selectable viewable elements. In the second scenario, the process would involve VSCI utility 125 first checking the alternate word database 138 to search for any alternate words, e.g., synonyms or colloquially equivalent terms. Each of these alternate words and the original input "Delete" would then be presented as character sequences that are each compared with the text representations of the selectable viewable elements within the view hierarchy.

Method 1100 of FIG. 11 begins at start block and includes accessing 1102 an alternate word source (such as a thesaurus having synonyms and antonyms), in response to either (i) identifying a keyword or word within the speech input or (ii) not finding a match of the character sequence with any text representation within the electronic file. Method 1100 then includes retrieving 1104, from the alternate word source, at least one alternate word related to the at least one word or keyword. It is appreciated that the at least one alternate word could be a word having one or more correlations or a relation to the derived text from the speech input. With the alternate words identified, method 1100 includes expanding 1106 the character sequence to include both the at least one keyword and the at least one alternate word and performing 1108 the next comparison with the text representations from the electronic file using the expanded character sequence with both the at least one keyword and the at least one alternate word. Method 1100 then ends or proceeds back to the general process, such as block 910 in FIG. 9B.

Figure 12A:
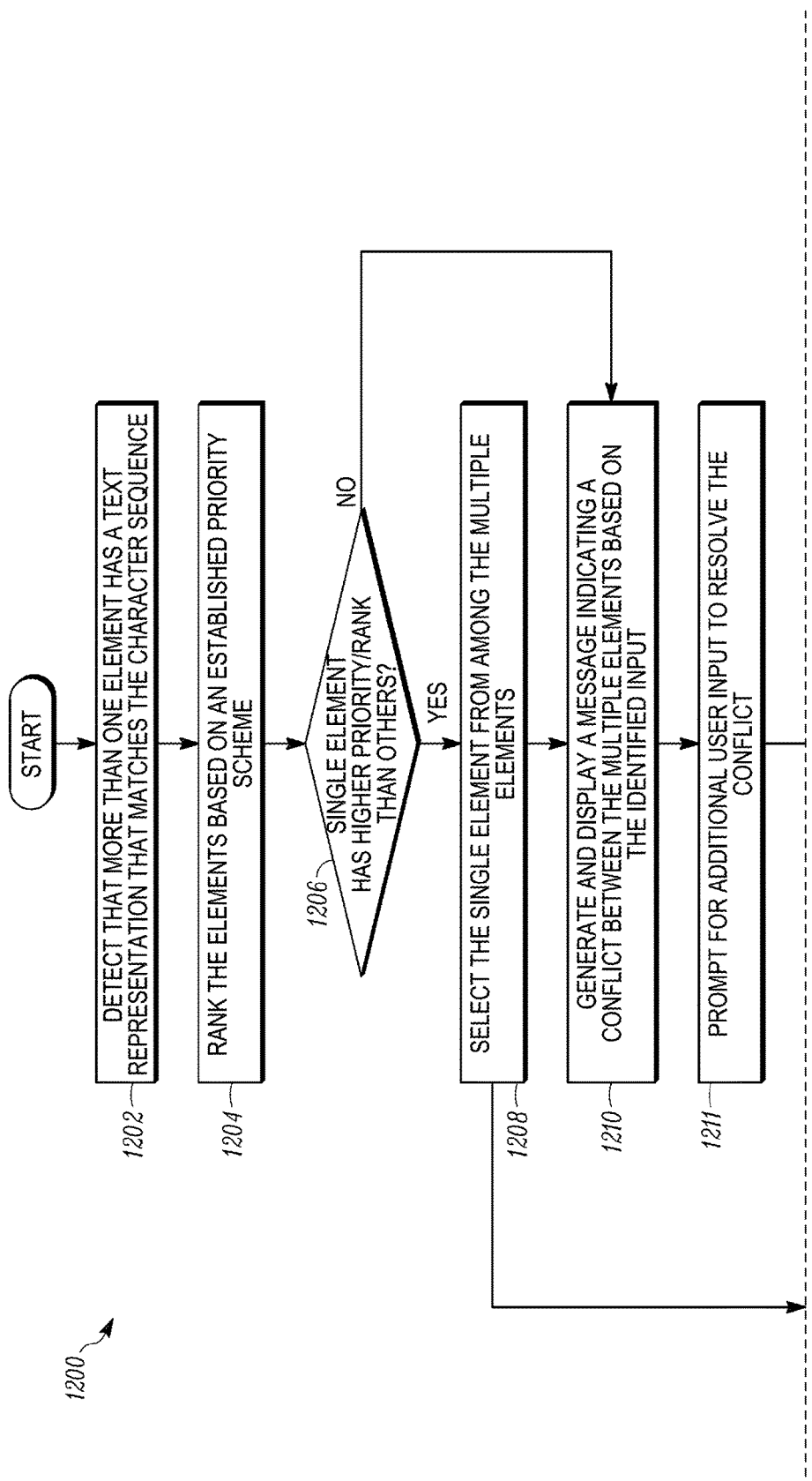
FIGS. 12A and 12B illustrate a flow chart of a method for resolving conflicts when multiple elements in the view hierarchy of the viewable screen can be associated with a received text or speech input, according to at least one embodiment.
Figure 12B:
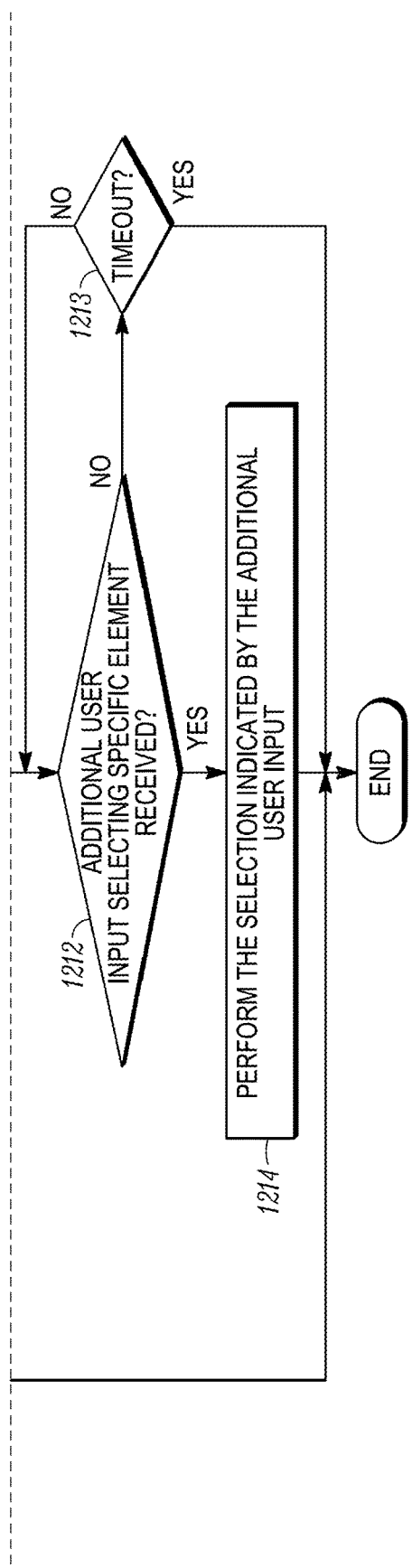
Figure 13:
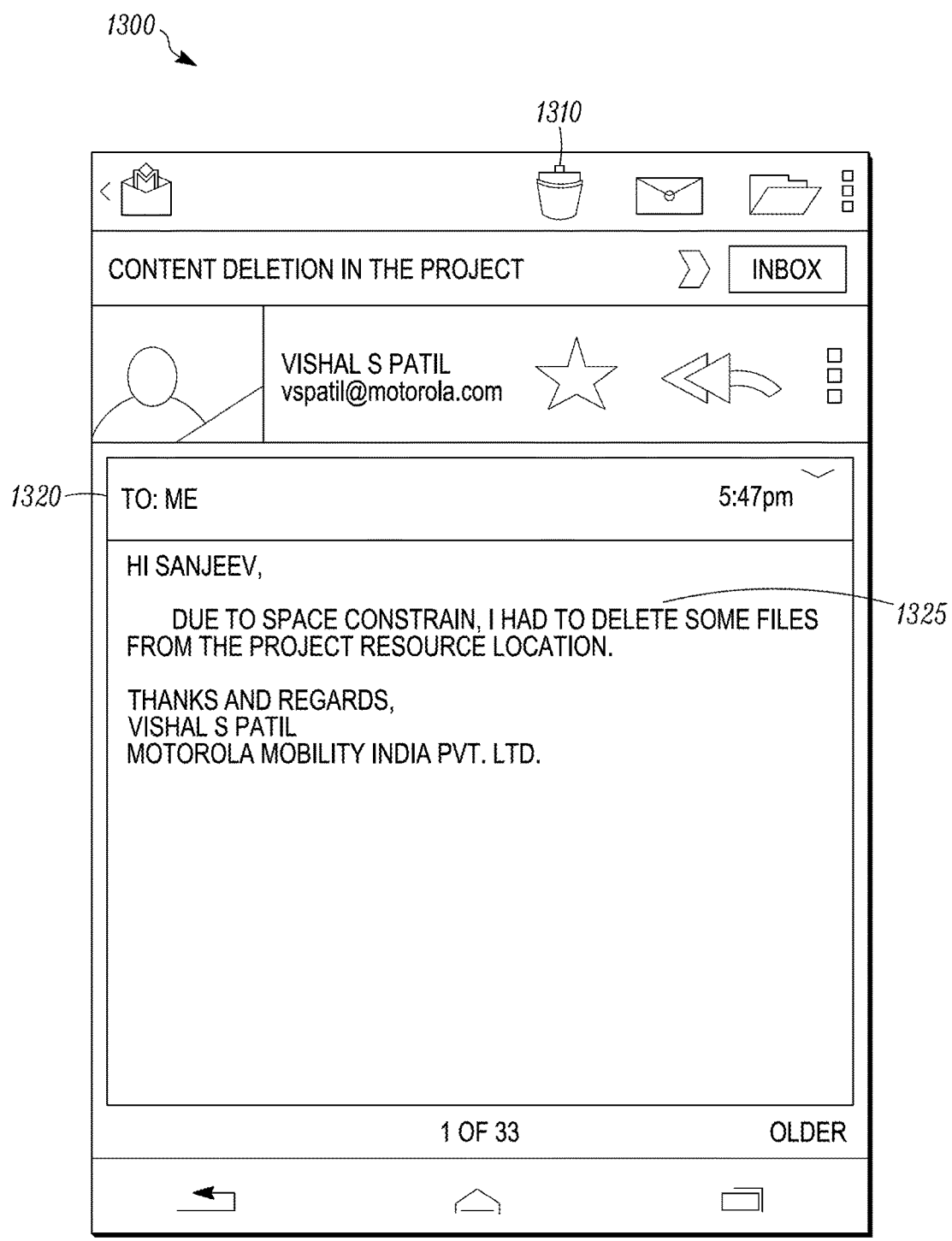
FIG. 13 is an example viewable screen illustrating how a possible conflict can occur when multiple viewable elements match a received input, according to one embodiment.

FIGS. 12A and 12B describe a priority scheme that is utilized when there are multiple selectable viewable elements that match the received input, such as can occur at block 909 (FIG. 9B) or block 1017 (FIG. 10B). Method 1200 of FIGS. 12A and 12B begins at start block and detects 1202 that there is more than one element with a matching text representation as the character sequence. In response to detecting that more than one element has a matching text representation to the character sequence, method 1200 includes ranking 1204 the more than one element based on an established priority scheme. Method 1200 then includes determining 1206 whether any single element of the more than one element has a higher priority or rank than the others. For example, VSCI utility 125 may be preset to give higher priority to global navigation commands over screen specific navigation commands. Thus, if the speech input received resulted in a match to a same global navigation command as a screen specific navigation command (e.g., global navigation command "go back" 708 versus return to previous screen view "go back" 706), VSCI utility 125 automatically resolves the conflict by selecting the higher priority global navigation command. The user will then have to provide additional context data corresponding to the screen elements in order to have the screen specific navigation command selected. FIG. 13 presents an example viewable screen in which a conflict can arise due to multiple selectable viewable elements matching the input character sequence. Viewable screen 1300 represents an interface of an example mail box utility for electronic mail generation and receipt. Viewable screen 1300 includes top level mailbox action icons, including "delete" icon 1310, and the interface includes a prepared email 1320 displaying textual content that includes the word "delete" 1325. For purposes of illustration, both the "delete" icon 1310 and the word "delete" 1325 within the textual content are selectable viewable elements that are individually represented within the view hierarchy of the viewable screen. However, the "delete" icon 1310 is assigned a higher priority by nature of the icon being associated with an action icon (or a navigation command). Thus, receipt of the words "delete" as the character sequence would trigger a deletion of the email 1320. In order to trigger selection of the word "delete" 1325 a user would provide additional context such as "word delete".

Returning to the flow chart of FIGS. 12A and 12B, in response to identifying a single element among the more than one element having a higher priority, method 1200 provides selecting 1208 the single element from among the multiple elements. Method 1200 then proceeds to end block. However, in response to none of the multiple elements having a higher priority, method 1200 provides generating and displaying 1210 a message indicating a conflict between the multiple elements based on the first input, and prompting 1211 for additional user input to resolve the conflict. Although the additional user input is expected to be in the same mode (e.g., speech) as the first input, the additional user input can alternatively be a touch input or a keypad input. Method 1200 includes determining 1212 whether additional input is received that identifies which one of the more than one mapped elements should be selected. In response to receiving the additional user input selecting a specific one of the more than one element, method 1200 then includes performing 1214 the selection indicated by the additional user input. Otherwise, if no user input is received within a timeout period 1213, method 1200 ends without a specific selection being made. From the end block, the process may return to FIG. 9 or FIG. 10 to continue an in-progress function, or the process may go to the start of method 900 or 1000 or another process.

The flow chart of FIG. 14 illustrates a method for handling selection of multi-layered viewable elements and elements having mutually exclusive options. Method 1400 of FIG. 14 is triggered whenever the input character sequence maps to a multi-layered viewable element, such as Airplane mode 302 (FIG. 3A) and corresponding sliding bar indicator 304. Method 1400 begins at start block and includes a determination 1402 of whether the character sequence matches or maps to multi-layered view elements having multiple interconnected/interrelated elements. Specifically, method 1400 includes identifying when the character sequence includes text related to multiple interrelated view elements having at least two levels of hierarchy. For example, in FIG. 3A, viewable screen 360 displays airplane mode 302 at a first level hierarchy, with on/off sliding bar indicator 304 at a second level hierarchy. Receipt of character sequence "airplane mode" triggers selection of the sliding bar indicator 304 and toggling of the on/off option related to a current status of airplane mode 302. If no multi-layered element is found, then method 1400 treats 1412 the character sequence as requiring selection of a single level element. The process then ends. However, in response to the character sequence including text related to multiple interrelated view elements, method 1400 further includes: identifying 1404 a primary view element among the multiple view elements; highlighting the primary view element; and applying any actions associated with the primary view element. Method 1400 further includes subsequently performing 1406 a selection of a secondary or next level view element remaining among the multiple interconnected view elements. Thus, in the above example, airplane mode 302 is first identified and highlighted, followed by selection and toggling of on/off sliding bar indicator 304.

In embodiments in which the view options are mutually exclusive, such as when an on/off option is presented as a next level element, selection of the primary level element can automatically toggle the selection from a current selection to a next selection (e.g., from "off" to "on" and vice-versa). Thus, in one embodiment, in response to determining 1408 that the secondary view element is one of a first visible selection and a second visible selection for the primary view element, the selecting of the corresponding multiple view elements of method 1400 further includes: identifying a current visible selection of the secondary view element; and automatically toggling 1410 the secondary view element to a next visible selection from the current visible selection that is displayed on the viewable screen. The toggling can be performed in response to the character sequence including text related to one of the first and the second visible selections. Method 1400 then ends. From the end block, the process may go to the start of method 900, the start of method 1000, or another process.

In the flow charts presented herein, certain functions of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

A description is now presented of FIGS. 15-23, which illustrate a sequence of screens showing one implementation of speech-directed navigation between screens on a smartphone, based on the specific screen content and a corresponding view hierarchy of each screen. As is clearly illustrated by the figures, the content of the received speech (or voice input) correlates to actual viewable elements on the screen. Executing in the background is VSCI utility 125, utilizing the view hierarchy of the displayed screen elements to perform the matching with the received speech input converted/translated into a corresponding character sequence. Thus seamless voice control of the electronic device is provided without a need for pre-programming specific functions and words for use with the multiple different screens that can be generated on the electronic device. In the various figures, the received speech input is converted to a character sequence (i.e., words and/or text) that is illustrated below the active screen, i.e., the screen that is being displayed when the speech input is received at the device. The following table presents a summary of each received speech input or character sequence mapped against the active screen and the actions taken in response to or as a result of the receipt of the specific speech input. The reference numeral of each screen is directly correlated to the figure number.

TABLE

| Received Speech | Active Screen/s | Responsive Action/s |
|---|---|---|
| Home | A previous screen (Not shown) | Display Home screen 1500 |
| "Play Store" | 1500 | Select Play Store icon 1510; Open Play Store screen 1600 |

TABLE-continued

| Received Speech | Active Screen/s | Responsive Action/s |
|---|---|---|
| "Search" | 1600, 1700 | Select search icon 1610; Open search bar of Play Store screen and display keyboard and microphone to receive search input; Open screen 1700 |
| "Keep" | 1700 | Enter word "keep" in search bar; trigger search for "keep" in Play Store applications directory; Generate screen 1800 |
| "Okay" or "Enter" | 1800, 1900 | Prompt for user selection or re-entry; Select and display multiple apps with word "keep" in title |
| "Google" OR "Google Keep" | 1900 | Select "Google Keep" from list of selectable options; Go to play store and open Google Keep installation utility |
| "Install" | 2000 | Select Install icon 2010; Initiate installation of Google Keep on device; |
| "Accept" | 2100 | Select Accept icon 2110; Open screen 2200; Display installation screen 2200 with install status bar |
| "Open" | 2300 | Select "open" icon 2310 when installation complete; Open Google Keep application on device |

As shown by the figures and described within the above table, when a particular spoken word or phrase is received as an input and the spoken word/phrase maps to or substantially matches a text representation of an element that is currently being displayed on the active screen, the result of receiving that spoken word/phrase is the selection of the specific element and triggering of the underlying function associated with selection of that element. Thus, the words "play store", received as a spoken input while screen 1500 is the active screen, are converted from speech to their corresponding text-based character sequence, which is then compared to the view hierarchy of the active screen 1500. The screen's view hierarchy would include the words "play store", and the VSCI utility 125 thus: (i) matches the character sequence to that element on screen 1500; and (ii) triggers the selection of the element "play store" on screen from among the different options that are displayed on screen 1500. Similarly, receipt of the word "Install" as speech input while active screen 2000 is being displayed results in the icon for "Install" being highlighted on screen followed by the install process being activated for the selected application.

Figure 18:
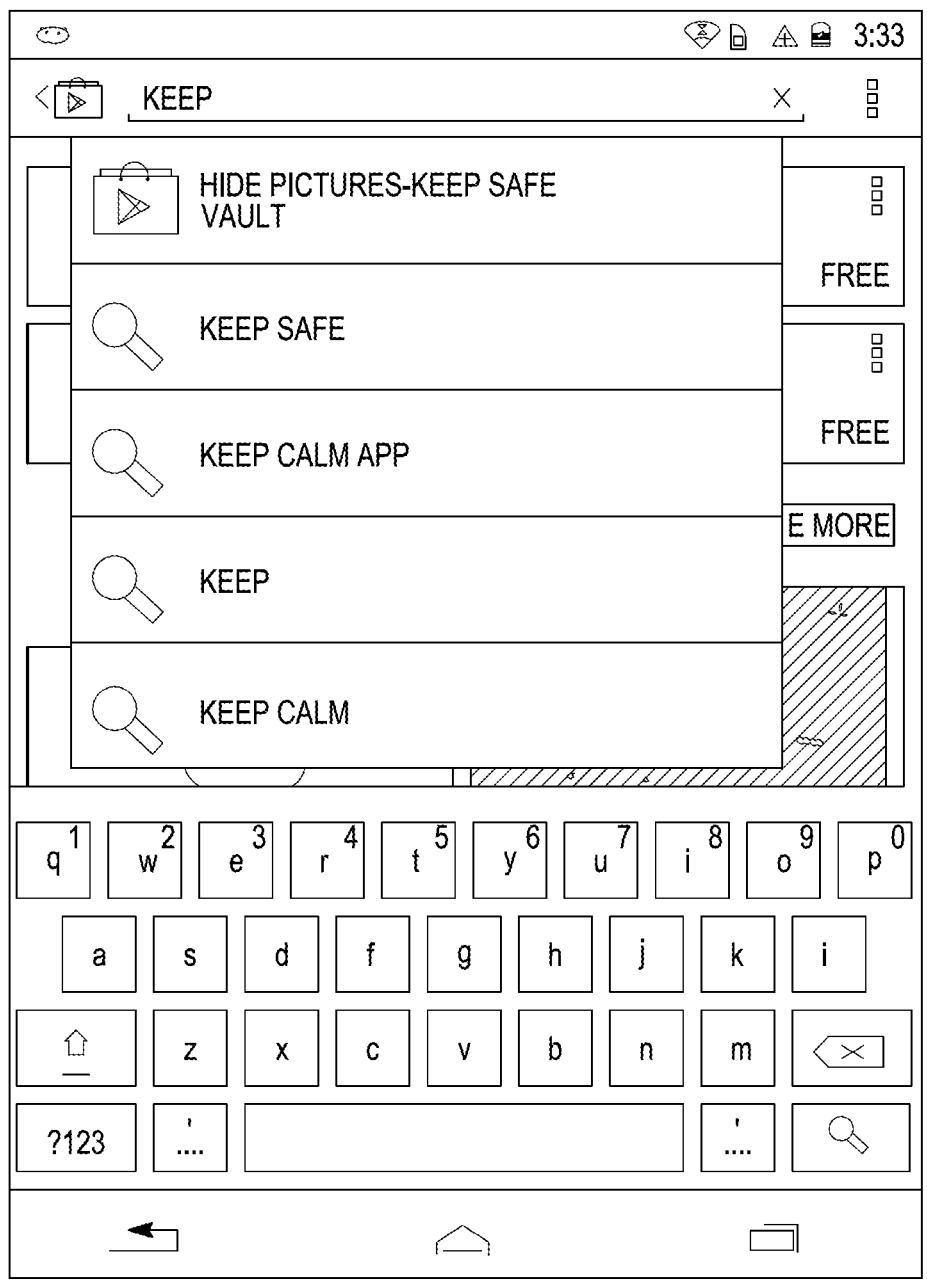
Figure 19:
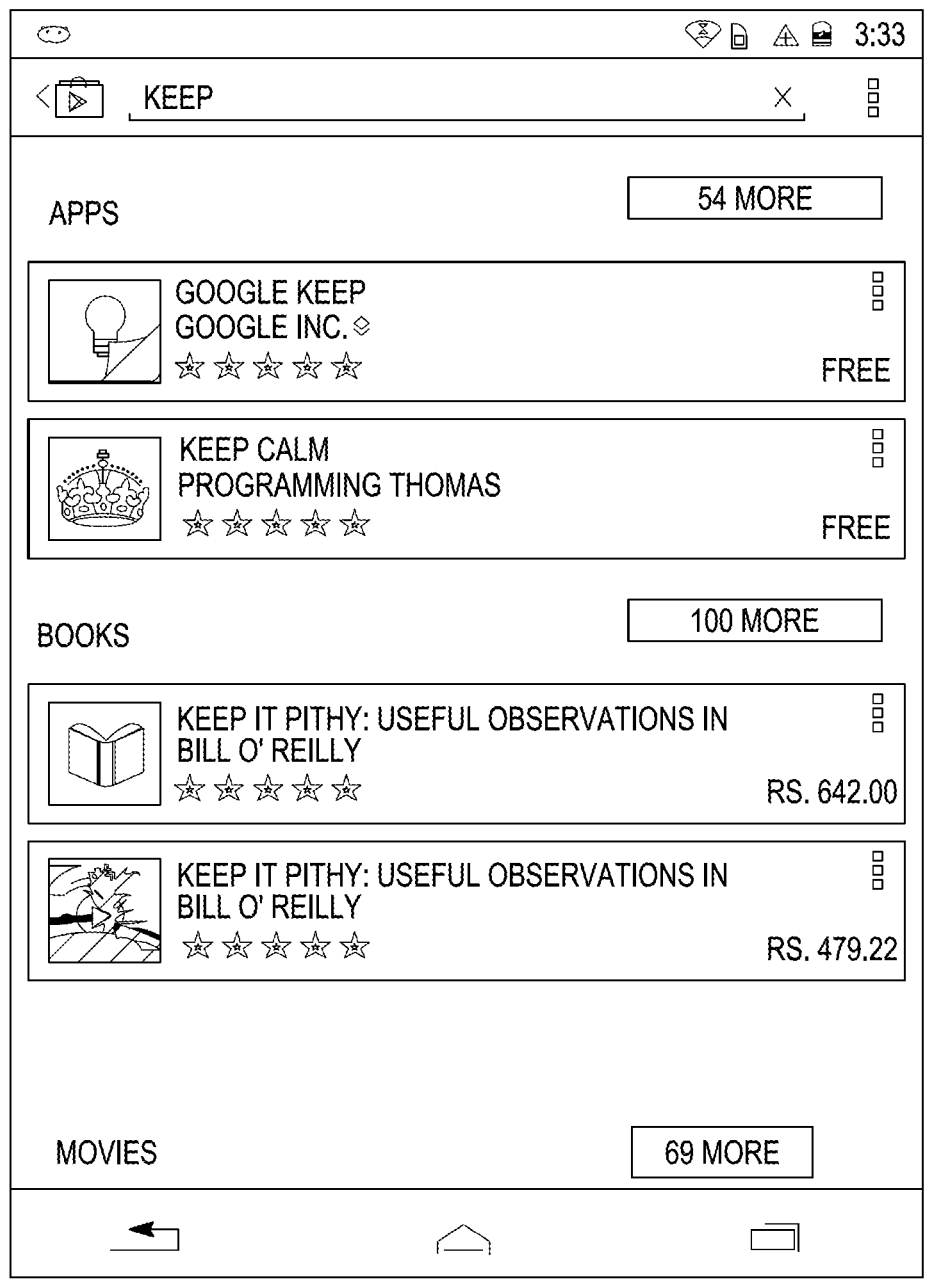
Figure 20:
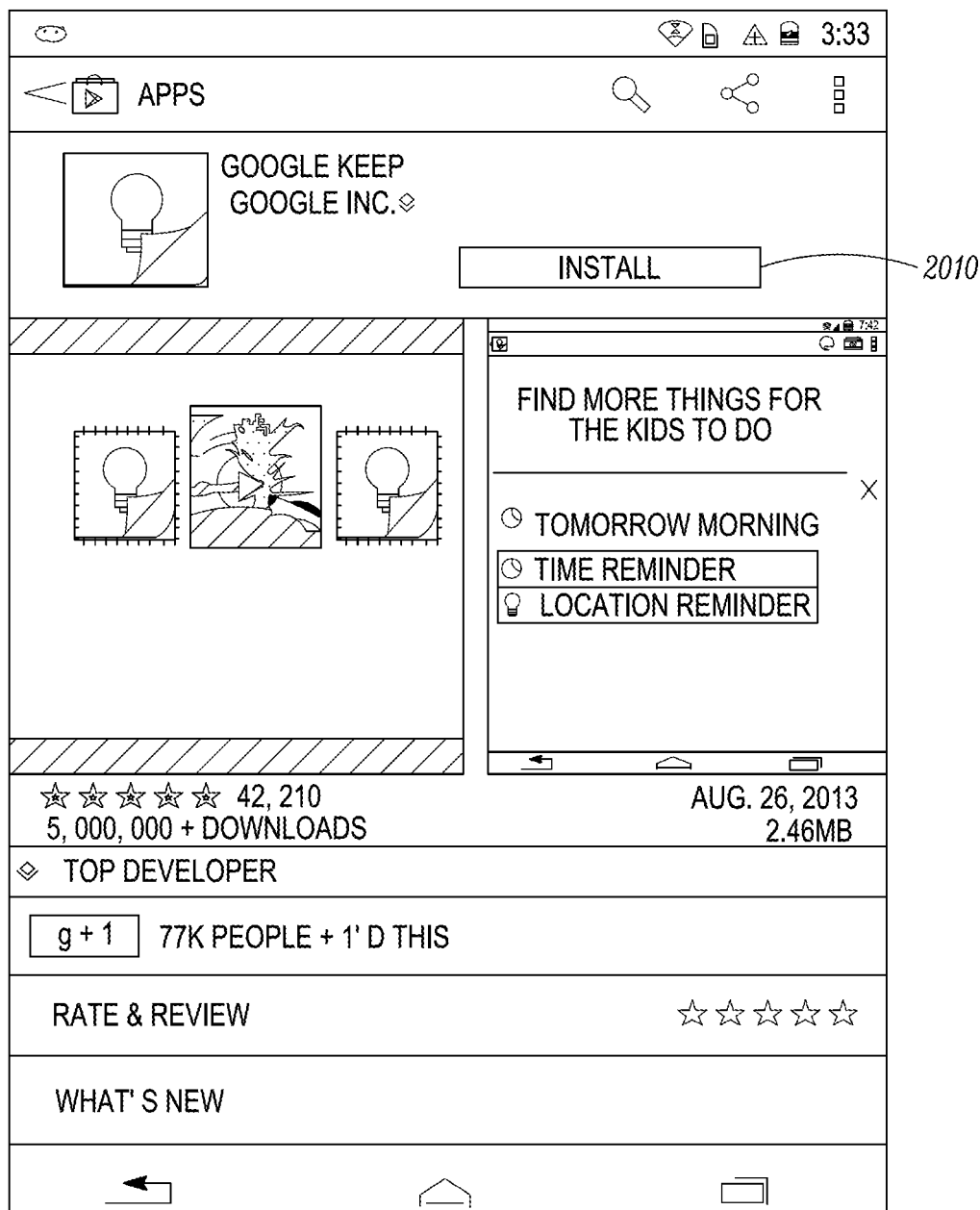
Figure 21:
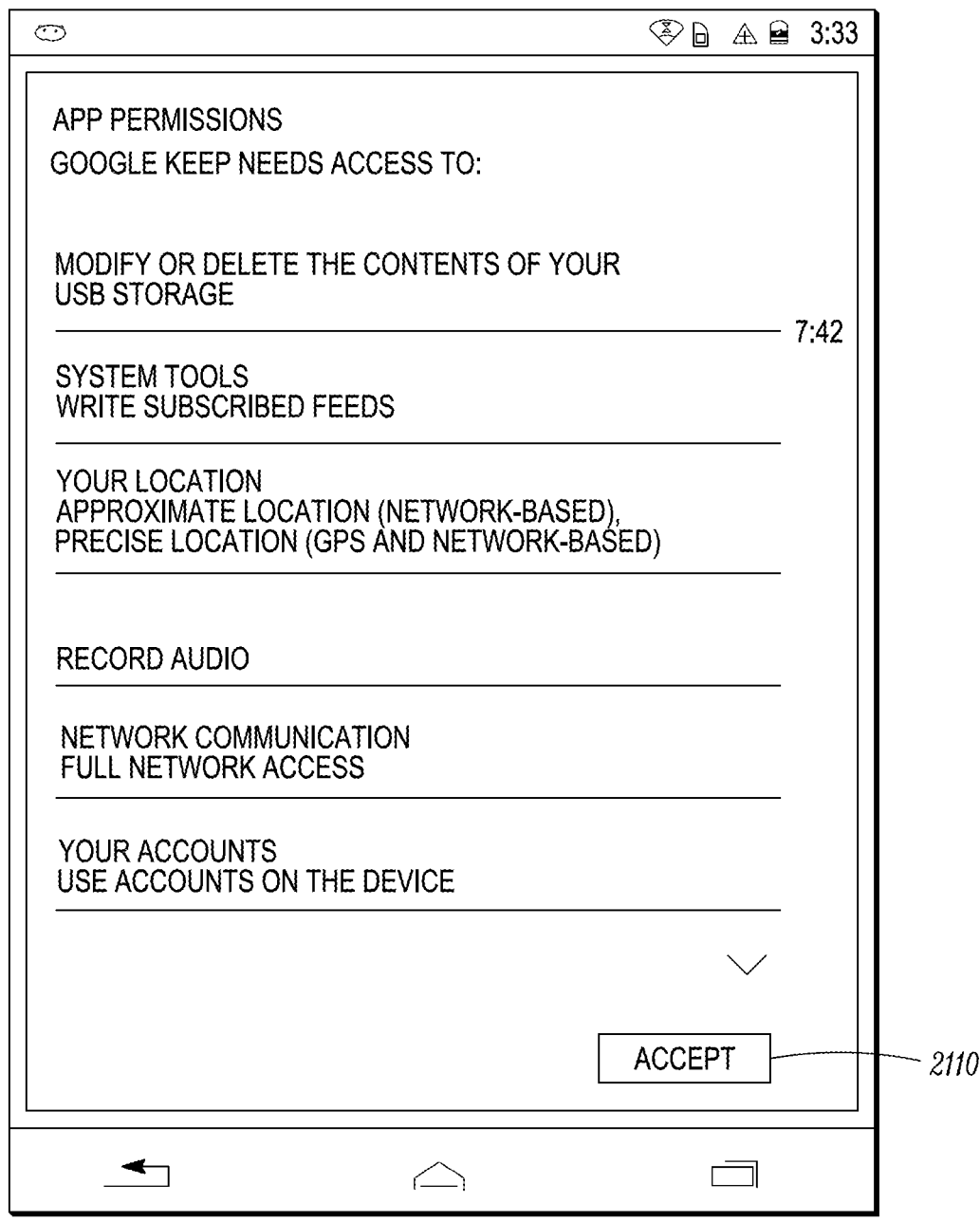
Figure 22:
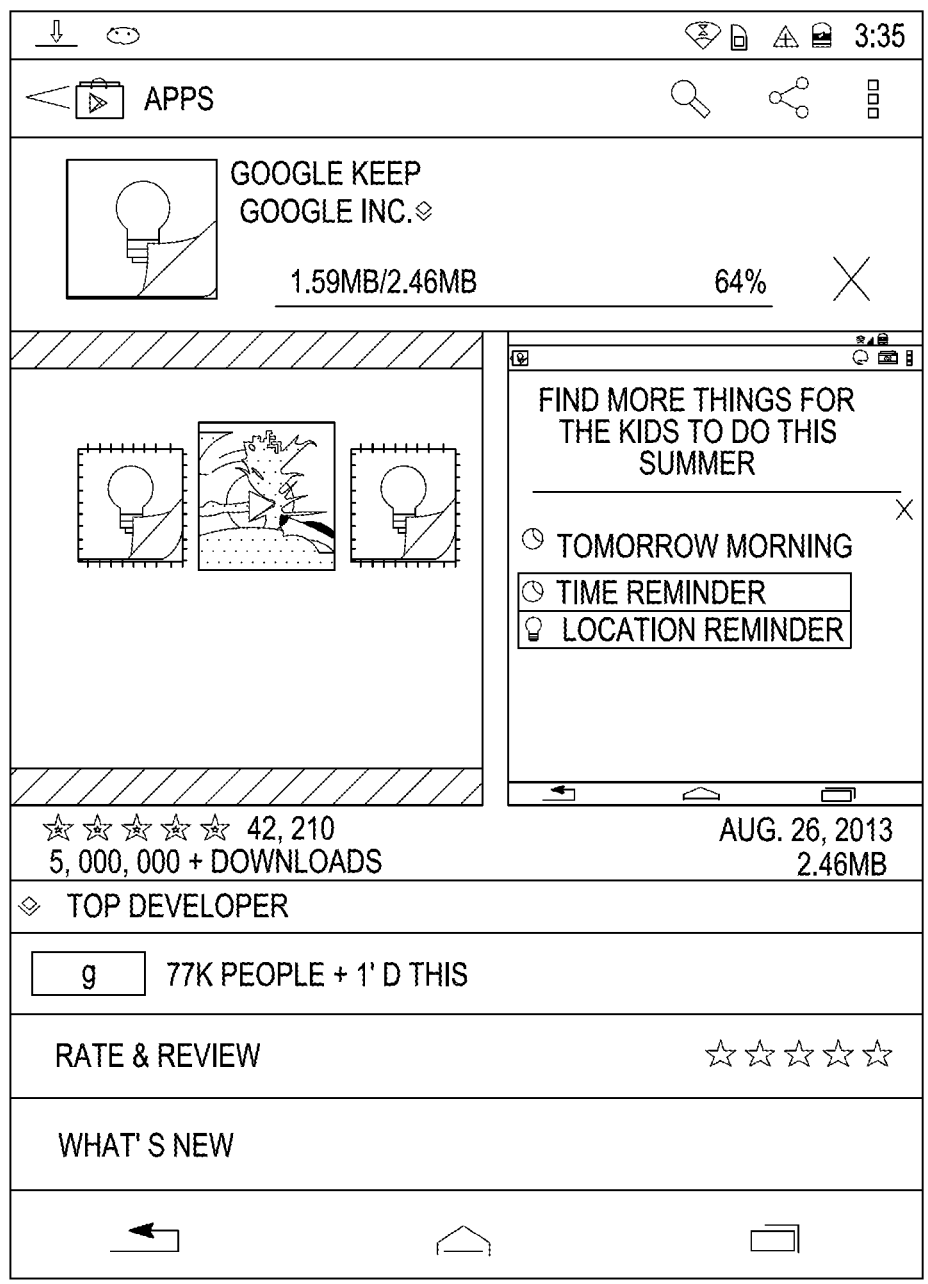
Figure 23:
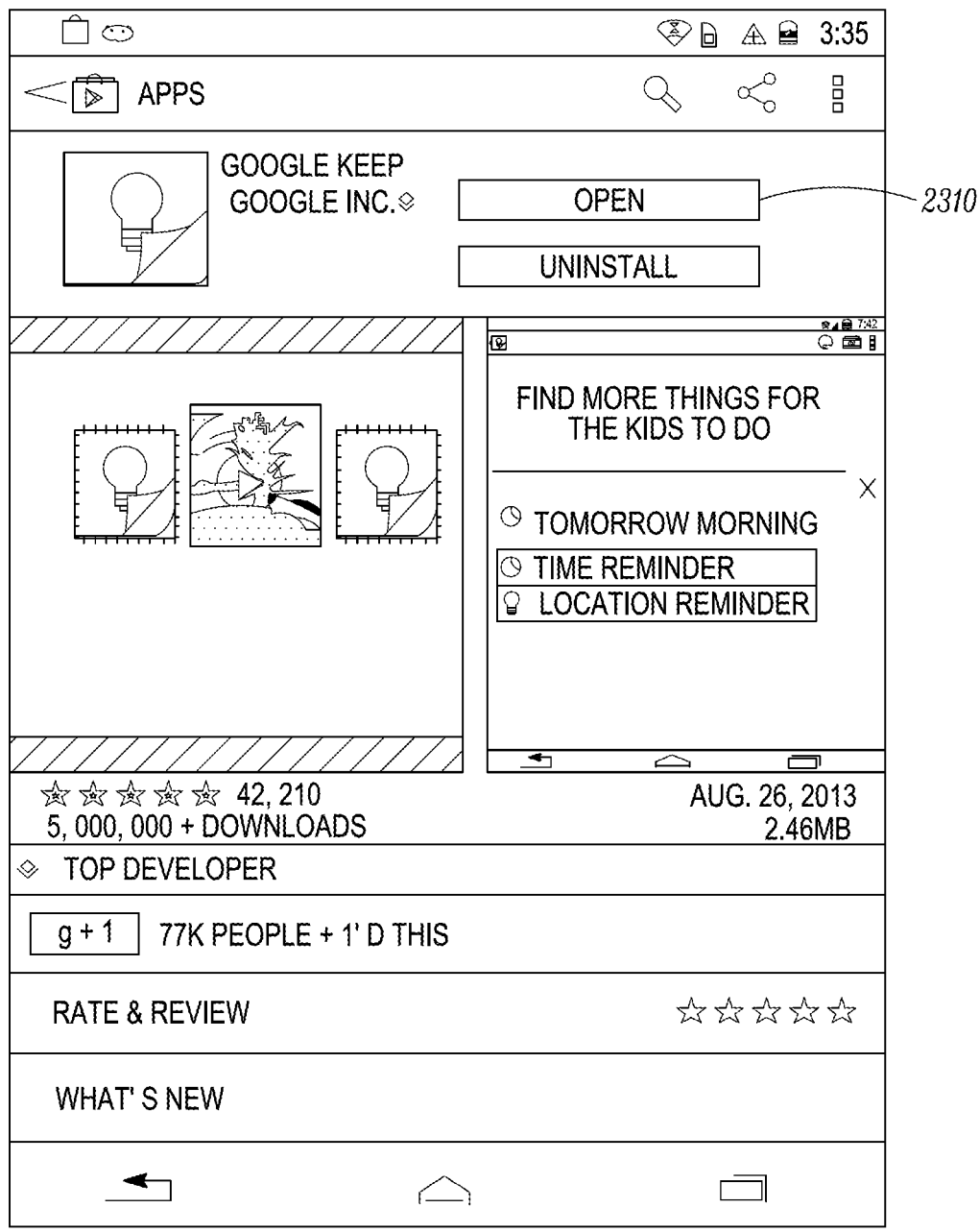

FIGS. 18-20 present one example of the matching of the character sequence to multiple different options on the active screen. In this example, the speech input "keep" would map to all four applications shown that have the word "keep" associated with their names. The method of FIGS. 12A and 12B can be used to enable the user to provide a more specific selection by using a priority scheme (e.g., first matching element starting from the top left of the screen), by adding more words to the speech input, or by manually selecting one of the multiple displayed options. It is anticipated that in one or more embodiments, a prompt or notification can also be generated requesting an additional entry or specific selection by the user. That prompt may be displayed on screen or provided by an audio output, in alternate embodiments. As previously described, pre-programmed priorities can also be applied to enable automatic selection of a specific higher priority or rank element from among the various matching elements available for selection on the active screen.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Implementation of the functional features of the disclosure is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general disclosure.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A computer-implemented method comprising:
providing, for display, a first user interface that includes a first user interface element that corresponds to a text string and a second, different user interface element that corresponds to the text string;
receiving audio data of an utterance that includes the text string;
providing, for display, a second user interface that indicates that both the first user interface element and the second, different user interface element correspond to the utterance;
receiving data indicating a selection of a particular one of the first user interface element or the second, different user interface element; and
in response to receiving the data indicating the selection of the particular one of the first user interface element or the second, different user interface element:
performing an action corresponding to the particular one of the first user interface element or the second, different user interface element; and
storing data indicating to perform the action corresponding to the particular one of the first user interface element or the second, different user interface element (i) in response to receiving additional audio data of an additional utterance that includes the text string, (ii) without providing, for display, the second user interface, and (iii) without receiving data indicating an additional selection of the particular one of the first user interface element or the second, different user interface element.

2. The method of claim 1, wherein receiving data indicating a selection of the particular one of the first user interface element or the second, different user interface element comprises:
receiving touch input indicating the selection of the particular one of the first user interface element or the second, different user interface element.

3. The method of claim 1, wherein receiving data indicating a selection of the particular one of the first user interface element or the second, different user interface element comprises:
receiving other audio data corresponding to an additional utterance that indicates the selection of the particular one of the first user interface element or the second, different user interface element.

4. The method of claim 1, wherein the utterance only includes the text string.

5. The method of claim 1, comprising:
providing, for display, a third user interface that includes the first user interface element and the second, different user interface element;
receiving other audio data corresponding to another utterance that includes the text string; and
in response to receiving the other audio data, performing the action corresponding to the particular one of the first user interface element or the second, different user interface element.

6. The method of claim 5, wherein the other utterance only includes the text string.

7. The method of claim 1, comprising:
providing, for display, a third user interface that includes the first user interface element and the second, different user interface element;
receiving other audio data corresponding to another utterance that includes the text string;
providing, for display, a fourth user interface that indicates that both the first user interface element and the second, different user interface element correspond to the additional utterance; and
after a particular amount of time has elapsed:
receiving additional data indicating a selection of the first user interface element or the second, different user interface element; and
providing, for display, the third user interface.

8. The method of claim 1, wherein the first user interface element is an icon that corresponds to an action of an application and the second, different user interface element is user inputted text.

9. The method of claim 1, wherein the first user interface element and the second, different user interface element are auto completion entries in a drop-down auto completion menu.

10. A system comprising:
one or more computers and one or more storage devices storing instructions that are operable, when executed by the one or more computers, to cause the one or more computers to perform operations comprising:
providing, for display, a first user interface that includes a first user interface element that corresponds to a text string and a second, different user interface element that corresponds to the text string;
receiving audio data of an utterance that includes the text string;
providing, for display, a second user interface that indicates that both the first user interface element and the second, different user interface element correspond to the utterance;
receiving data indicating a selection of a particular one of the first user interface element or the second, different user interface element; and
in response to receiving the data indicating the selection of the particular one of the first user interface element or the second, different user interface element:
performing an action corresponding to the particular one of the first user interface element or the second, different user interface element; and
storing data indicating to perform the action corresponding to the particular one of the first user interface element or the second, different user interface element (i) in response to receiving additional audio data of an additional utterance that includes the text string, (ii) without providing, for display, the second user interface, and (iii) without receiving data indicating an additional selection of the particular one of the first user interface element or the second, different user interface element.

11. The system of claim 10, wherein receiving data indicating a selection of the particular one of the first user interface element or the second, different user interface element comprises:
receiving touch input indicating the selection of the particular one of the first user interface element or the second, different user interface element.

12. The system of claim 10, wherein receiving data indicating a selection of the particular one of the first user interface element or the second, different user interface element comprises:
receiving other audio data corresponding to an additional utterance that indicates the selection of the particular one of the first user interface element or the second, different user interface element.

13. The system of claim 10, wherein the utterance only includes the text string.

14. The system of claim 10, wherein the operations further comprise:
providing, for display, a third user interface that includes the first user interface element and the second, different user interface element;
receiving other audio data corresponding to another utterance that includes the text string; and
in response to receiving the other audio data, performing the action corresponding to the particular one of the first user interface element or the second, different user interface element.

15. The system of claim 14, wherein the other utterance only includes the text string.

16. The system of claim 10, wherein the operations further comprise:
providing, for display, a third user interface that includes the first user interface element and the second, different user interface element;
receiving other audio data corresponding to another utterance that includes the text string;
providing, for display, a fourth user interface that indicates that both the first user interface element and the second, different user interface element correspond to the additional utterance; and
after a particular amount of time has elapsed:
receiving additional data indicating a selection of the first user interface element or the second, different user interface element; and
providing, for display, the third user interface.

17. The system of claim 10, wherein the first user interface element is an icon that corresponds to an action of an application and the second, different user interface element is user inputted text.

18. The system of claim 10, wherein the first user interface element and the second, different user interface element are auto completion entries in a drop-down auto completion menu.

19. A non-transitory computer-readable medium storing software comprising instructions executable by one or more computers which, upon such execution, cause the one or more computers to perform operations comprising:
providing, for display, a first user interface that includes a first user interface element that corresponds to a text string and a second, different user interface element that corresponds to the text string;
receiving audio data of an utterance that includes the text string;
providing, for display, a second user interface that indicates that both the first user interface element and the second, different user interface element correspond to the utterance;
receiving data indicating a selection of a particular one of the first user interface element or the second, different user interface element; and
in response to receiving the data indicating the selection of the particular one of the first user interface element or the second, different user interface element:
performing an action corresponding to the particular one of the first user interface element or the second, different user interface element; and
storing data indicating to perform the action corresponding to the particular one of the first user interface element or the second, different user interface element (i) in response to receiving additional audio data of an additional utterance that includes the text string, (ii) without providing, for display, the second user interface, and (iii) without receiving data indicating an additional selection of the particular one of the first user interface element or the second, different user interface element.

20. The medium of claim 19, wherein the first user interface element is an icon that corresponds to an action of an application and the second, different user interface element is user inputted text.

* * * * *